(12) United States Patent
Nagai et al.

(10) Patent No.: US 7,860,374 B2
(45) Date of Patent: Dec. 28, 2010

(54) INFORMATION RECORDING METHOD, FORMAT CHANGING METHOD, AND INFORMATION REPRODUCTION METHOD

(75) Inventors: Ken Nagai, Ibaraki (JP); Satoshi Yabuta, Takatsuki (JP)

(73) Assignee: Panasonic Corporation, Osaka (JP)

(*) Notice: Subject to any disclaimer, the term of this patent is extended or adjusted under 35 U.S.C. 154(b) by 1327 days.

(21) Appl. No.: 11/218,428

(22) Filed: Sep. 6, 2005

(65) Prior Publication Data
US 2006/0062119 A1 Mar. 23, 2006

(30) Foreign Application Priority Data
Sep. 9, 2004 (JP) ............... 2004-262831

(51) Int. Cl.
*H04N 5/85* (2006.01)
*H04N 5/90* (2006.01)

(52) U.S. Cl. ............... 386/125; 386/95; 386/96; 386/126; 386/46

(58) Field of Classification Search ............... 386/83, 386/95, 96, 126, 125
See application file for complete search history.

(56) References Cited

U.S. PATENT DOCUMENTS 5,838,872 A * 11/1998 Kawara ............... 386/68
6,532,335 B2 * 3/2003 Otomo et al. ............... 386/95
2004/0001402 A1 * 1/2004 Hora ............... 369/47.12

FOREIGN PATENT DOCUMENTS

JP 2003-101927 4/2003

* cited by examiner

*Primary Examiner*—Jamie J Atala
(74) *Attorney, Agent, or Firm*—McDermott Will & Emery LLP

(57) ABSTRACT

For recording AV data in accordance with the DVD-VR format on a DVD medium which already has AV data recorded thereon in accordance with the DVD-Video format, it was conventionally necessary to perform logical formatting of the DVD medium. The DVD-Video format and the DVD-VR format are compared regarding the sum of data sizes of a volume structure, a file structure and management information, and an area having a size corresponding to a larger sum is saved on a disc. While a program is being recorded in accordance with the DVD-Video format, VOBU information and real time data information are recorded. During the format change, the volume structure, the file structure and the management information of the DVD-VR format are recorded in the saved area. Navigation data information of each VOBU is rewritten with the real time data information.

10 Claims, 20 Drawing Sheets

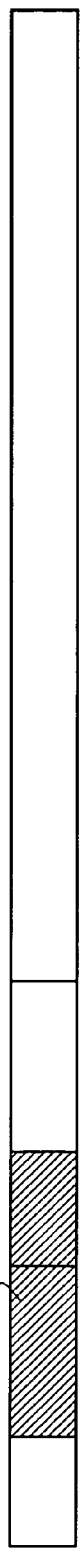
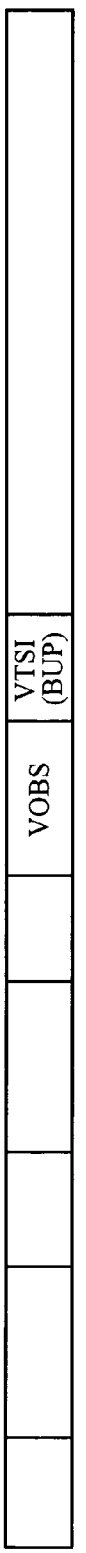

FIG. 8

| ID NUMBER OF VOB | ID NUMBER OF VOBU | RDI_PCK DATA |
|---|---|---|
| VOB#1 | VOBU#1 | RDI_PCK#1 |
| VOB#1 | VOBU#2 | RDI_PCK#2 |
| ... | ... | ... |
| VOB#1 | VOBU#i | RDI_PCK#i |
| VOB#2 | VOBU#1 | RDI_PCK#1 |
| ... | ... | ... |
| VOB#2 | VOBU#j | RDI_PCK#j |
| ... | ... | ... |
| VOB#n | VOBU#1 | RDI_PCK#1 |
| ... | ... | ... |
| VOB#n | VOBU#k | RDI_PCK#k |

FIG. 11

| ID NUMBER OF VOB | ID NUMBER OF VOBU | NV_PCK DATA |
|---|---|---|
| VOB#1 | VOBU#1 | NV_PCK#1 |
| VOB#1 | VOBU#2 | NV_PCK#2 |
| ... | ... | ... |
| VOB#1 | VOBU#i | NV_PCK#i |
| VOB#2 | VOBU#1 | NV_PCK#1 |
| ... | ... | ... |
| VOB#2 | VOBU#j | NV_PCK#j |
| ... | ... | ... |
| VOB#n | VOBU#1 | NV_PCK#1 |
| ... | ... | ... |
| VOB#n | VOBU#k | NV_PCK#k |

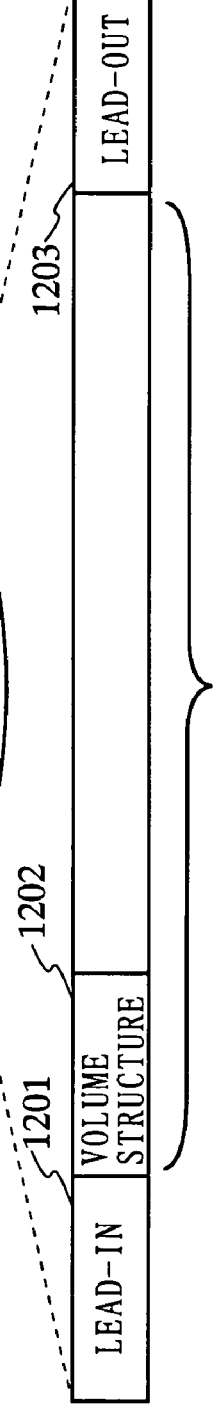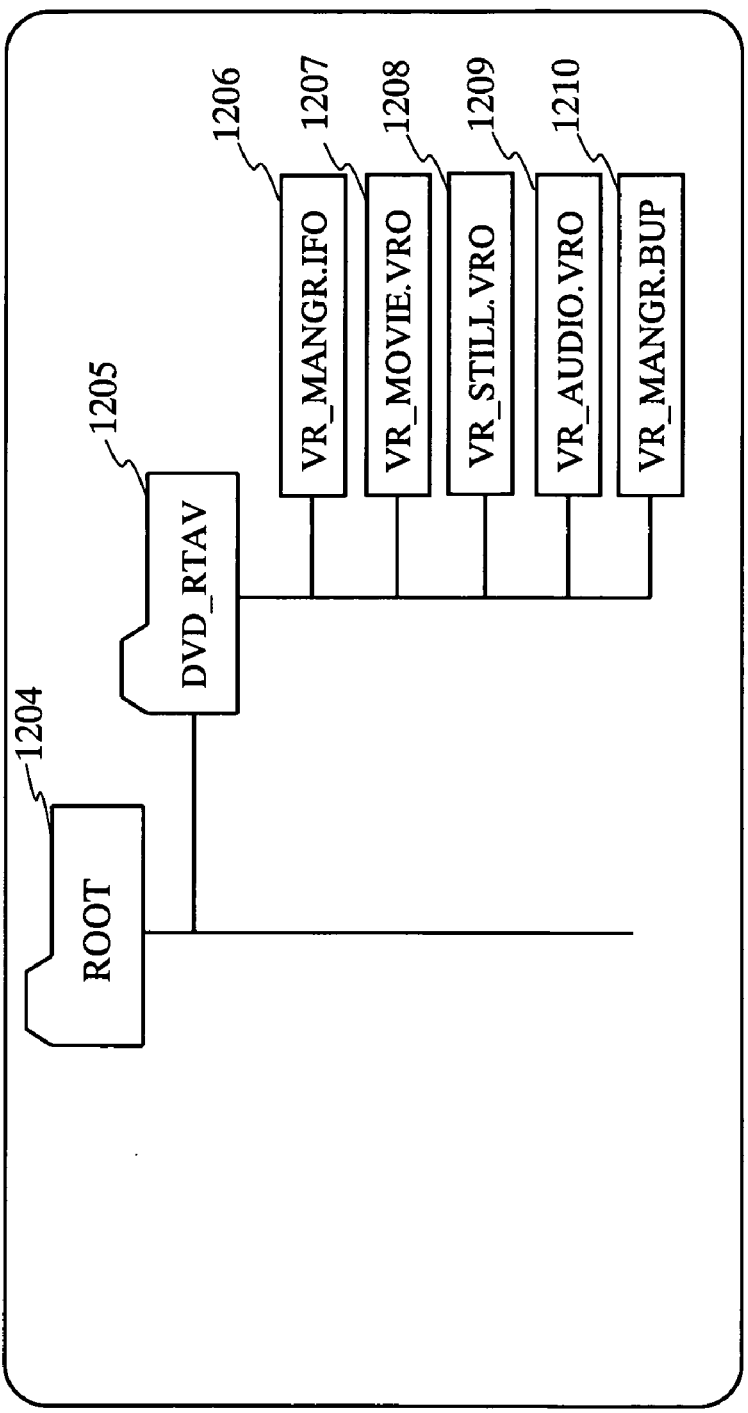
FIG. 12 PRIOR ART

INFORMATION RECORDING METHOD, FORMAT CHANGING METHOD, AND INFORMATION REPRODUCTION METHOD

BACKGROUND OF THE INVENTION

1. Field of the Invention

The present invention relates to an information recording method, a format changing method, and an information reproduction method; and more specifically to a method for recording video information or audio information on a recording medium, a method for changing the format of the video information or audio information recorded on the recording medium, and a method for reproducing the video information or audio information recorded on the recording medium.

2. Description of the Background Art

Recently, recordable DVDs (Digital Versatile Discs), including rewritable DVDs such as DVD-RW discs and DVD-RAM discs which are phase change optical discs having a capacity of several gigabytes and write once read many DVDs such as DVD-R discs, have been developed. Also, MPEG (Moving Picture Image Coding Experts Group) 2, which is a coding standard for digital AV (audio/video) data, has been put into practice. The development of the recordable DVDs and MPEG2 has made it possible to handle large capacity data such as video data in the state of being recorded on optical discs which are superb in access speed.

In order to fully utilize the accessibility of the optical discs, recordable DVDs have management information recorded thereon for managing where on the disc certain data is recorded, unlike tape mediums. For regulating the management information, the DVD Specifications for Rewritable/Re-recordable Discs (DVD Video Recording format; hereinafter, referred to as the "DVD-VR format") have been issued. Also, the DVD Specifications for Read-Only Discs (DVD Video format; hereinafter, referred to as the "DVD-Video format"), which are set for mediums which can be only reproduced, are used as a recording format. In the following description, descriptors, pointers and the like which are recorded in volume structures and file structures of DVD mediums have a data structure defined in the ISO/IEC 13346 Standards or the UDF (Universal Disc Format) Standards, unless otherwise specified.

As described above, there are two different recording formats, i.e., the DVD-VR format and the DVD Video format, for DVD-RW discs and DVD-R discs. Although the details will be described later, the logical structure of the DVD-VR format (FIG. 12) is different from the logical structure of the DVD-Video format (FIG. 17). The file system of the DVD-VR format (FIG. 13) is also different from the file system of the DVD-Video format (FIG. 18). (A "file system" is a system used for managing data in a disc as directories or files). In addition, the recording format of AV data and management data of the DVD-VR format (FIG. 14 through FIG. 16) is different from the recording format of AV data and management data of the DVD-Video format (FIG. 19 and FIG. 20).

Due to the existence of these different recording formats, a method for changing the format has conventionally been demanded. An exemplary conventional technology especially related to the present invention is described in Japanese Laid-Open Patent Publication No. 2003-101927. This patent document describes an apparatus for converting stream data of the DVD-VR format into stream data of the DVD-Video format.

Hereinafter, with reference to FIG. 12 through FIG. 20, the DVD-VR format and the DVD-Video format will be described in detail. First, a data structure of the DVD-VR format will be described. FIG. 12 shows a physical data structure managed by the physical sector address of the DVD-VR format and a logical data structure managed by the file system of the DVD-VR format.

In FIG. 12, a recordable DVD 1200 is a DVD medium having data of a program recorded thereon in accordance with the DVD-VR format. A lead-in area 1201 has, for example, a reference signal necessary for stabilizing servo and a medium identification signal recorded therein. A volume structure area 1202 has management information for the file system recorded therein. A lead-out area 1203 has substantially the same reference signal as that in the lead-in area 1201 recorded therein. The lead-in area 1201 is recorded at the beginning of the physical sector address, and the lead-out area 1203 is recorded at the end of the physical sector address. A user data area is provided between the lead-in area 1201 and the lead-out area 1203. In the user data area, logically valid data is recorded. At the beginning of the user data area, the volume structure area 1202 is recorded.

The data recorded in the user data area has a file structure as shown in FIG. 12. More specifically, the data recorded in the user data area is recorded in a DVD_RTAV directory 1205 below a ROOT directory 1204. The data recorded in the DVD_RTAV directory 1205 is recorded as a plurality of files. These files are roughly classified into two types. One is a management information file, and the other is AV files. The AV files are further classified into three types, i.e., a moving picture file, a still picture file, and an audio file including audio data dubbed over still pictures. As information for managing these three types of AV files, the management information file is recorded.

With the DVD-VR format, the management information file is recorded as a VR_MANGR.IFO file 1206. The moving picture file is recorded as a VR_MOVIE.VRO file 1207, the still picture file is recorded as a VR_STILL.VRO file 1208, and the audio file is recorded as a VR_AUDIO.VRO file 1209. A VR_MANGR.BUP file 1210 is a backup file having the same information as that of the management information file, i.e., the VR_MANGR.IFO file 1206, as a reserve.

With reference to FIG. 13, a data structure of the file system will be described. The data recorded in accordance with the DVD-VR format has a structure as shown in FIG. 13. More specifically, a volume 1300, which is the user data area, includes a volume structure area 1301, a file structure area 1302, a file data area 1303, and a reserved volume structure area 1304.

Recorded in the volume structure area 1301 are, for example, a volume recognition sequence 1305 having volume recognition information, a primary volume descriptor 1306 having volume attribute information, a implementation use volume descriptor 1307 having information for the processing system, a partition descriptor 1308 having partition information, a logical volume descriptor 1309 having identification information on a logical volume, an unallocated space descriptor 1310 having information on an unallocated space in the volume space, a terminating descriptor 1311 indicating the end of a basic descriptor sequence, a logical volume integrity descriptor 1312 having information on the integral state of the logical volume, and an anchor volume descriptor pointer 1313 having access start information to the volume. (It should be noted that the order and the types of data recorded in the volume structure area 1301 are not limited to the above.)

Recorded in the file structure area 1302 are, for example, a file set descriptor 1315, a terminating descriptor 1316, a space bitmap descriptor 1314 indicating the recording state of each unit such as a sector or an ECC block, a file entry including distribution information of the files of data recorded in the file data area (the start address and the data length), and a file identifier descriptor including information such as file names and attribute of the files. The file data area 1303 has the management information and the AV file described above recorded therein. The reserved volume structure area 1304 has the same data as the data recorded in the volume structure area 1301 recorded therein as a reserve.

With reference to FIG. 14, a structure of the AV data of the DVD-VR format will be described. The highest logical unit of the AV data conformed to the DVD-VR format is a Program Chain 1400 (hereinafter, referred to as the "PGC"). The PGC designates the order of reproduction of Cells. A "Cell" is a unit of partial reproduction of the PGC. Cells are classified into a moving picture Cell which forms a moving picture zone and a still picture Cell which forms a still picture zone. A physical unit corresponding to the Cell is a Video Object (hereinafter, referred to as the "VOB"). A moving picture VOB corresponds to a moving picture Cell, and a still picture VOB corresponds to a still picture Cell. A Cell refers to the entirety of, or a part of, the VOB.

A moving picture VOB includes a plurality of Video Object Units (hereinafter, referred to as the "VOBUs"). A still picture VOB Group (hereinafter, referred to as the "VOG") includes at least one still picture VOB. Management information of a moving picture VOB called "M_VOBI" is recorded in the VR_MANGR.IFO 1207, and management information of a still picture VOG called "S_VOGI" is also recorded in the VR_MANGR.IFO 1207. The moving picture VOBs and the still picture VOGs are accessed via the M_VOBI and the S_VOGI, respectively. FIG. 14 shows a PGC of the moving picture data. As shown in FIG. 14, a set of the moving picture VOBs is the moving picture file VR_MOVIE.VRO file 1207.

Next, a data structure of a VOB of the DVD-VR format will be described. FIG. 15 shows a data structure of a VOB. A VOB 1500 includes a plurality of VOBUs arranged on a time series basis. Hereinafter, a structure of a VOBU will be described using a VOBU 1501 shown in FIG. 15. The VOBU 1501 includes a sequence of 2 kilobyte packs. Packs are classified into a video pack 1503 (V_PCK) including picture data on the basis of a Group of Pictures (GOP) unit, an audio pack (A_PCK) 1504 having audio data, a sub picture pack (SP_PCK) 1505 having sub picture data, and a real time data information pack (RDI_PCK) 1502 having real time data information including reproduction time information, reproduction control information and copy control information. In general, a VOBU includes at least one V_PCK 1503 and at least one A_PCK 1504 which are multiplexed, and an RDI_PCK 1502 is multiplexed at the beginning of the VOBU.

The V_PCT 1503 includes at least one piece of picture data, the reproduction time of which is about 0.4 to 1.0 second. The RDI_PCK 1502 includes a Pack Header 1506, a System Header 1507, a Packet Header 1508, a sub stream ID (Sub_Stream_ID) 1509, and Real-Time Information Data 1510, which are conformed to the MPEG. The Real-Time Information Data 1510 includes an RDI_GI 1511 including reproduction time information, a DCI_CCI 1512 including reproduction control information and copy control information, and an MNFI 1513 including manufacturer information.

With reference to FIG. 16, a structure of the VR_MANGR.IFO, which is a management information file of the DVD-VR format, will be described. As shown in a table 1600 in FIG. 16, a VR_MANGR.IFO file 1206 is roughly divided into seven tables. Among the seven tables, an M_AVFIT 1601 includes information on the VR_MOVIE.VRO file 1207, which is a moving picture file. An M_AVFI 1602 included in the M_AVFIT 1601 includes an M_VOBI 1603, which is information on each VOB described above. The M_VOBI 1603 includes, for example, start display time information VOB_V_S_PTM 1604, an end display time information VOB_V_E_PTM 1605, and a TMAPI 1606 which is a conversion table of the display time and the recording address. The TMAPI 1606 includes, for example, a TM_ENT 1608 representing information on the entire TMAPI 1606 and a VOBU_ENT 1609 having information on the size and the reproduction time of each VOBU.

Next, the DVD-Video format, which is another recording format for DVD-R discs and DVD-RW discs in addition to the DVD-VR format, will be described. FIG. 17 shows a physical data structure managed by the physical sector address of the DVD-Video format and a logical data structure managed by the file system of the DVD-Video format. In the following, differences from the DVD-VR format will be described.

As shown in FIG. 17, with the DVD-Video format, a VIDEO_TS directory 1701 includes a video manager (hereinafter, referred to as the "VMG") 1700 having a management information file on the entire disc, a management information file and an AV file of each video title (program) and a backup file of the management information file of each video title. The VMG 1700 includes a VIDEO_TS. IFO file 1702 having management information on the entire disc, a VIDEO_TS.VOB file 1703 which is a video object file for the menu, and a VIDEO_TS.BUP file 1704 which is a backup file of the VIDEO_TS.IFO file 1702.

The management information file of each video title has a file name represented by VTS_XX_X. IFO (X is a numerical figure). In FIG. 17, a VTS_01_0.IFO file 1705 is an example thereof. Similarly, the AV file of each video title has a file name represented by VTS_XX_X.VOB. In FIG. 17, a VTS_01_1.VOB file 1706 is an example thereof. The backup file of the management information file of each video title has a file name represented by VTS_XX_X.BUP. In FIG. 17, a VTS_01_0.BUP file 1707 is an example thereof. A DVD medium can have a maximum of 99 video titles recorded thereon and a maximum of 9 AV files for each video title.

With reference to FIG. 18, a data structure of the file system of the DVD-Video format will be described. With the DVD-Video format, unlike the DVD-VR format, file system data conformed to the ISO9660 is also recorded in addition to the data conformed to the UDF. Examples of the file system data conformed to the ISO9660 are a path table 1806 and a directory record 1807 which are recorded in an ISO9660 file structure area 1802. Such a file system structure is referred to as the "UDF bridge". In a volume structure area 1801, data shown in FIG. 18 is recorded including a volume recognition sequence 1808. In a file structure area 1803, files shown in FIG. 18 including file identifier descriptors and file entries are recorded. In a file data area 1804, files including the management information files and the AV files described above are recorded. At the end of a volume 1800, an anchor volume descriptor pointer 1805 is recorded unlike with the DVD-VR format.

Next, a positional arrangement of the data in the file data area 1804 of the DVD-Video format will be described in detail. FIG. 19 shows a positional arrangement of the file data in the volume 1800 of the DVD-Video format. With the DVD-Video format, the VMG 1700 described above is located at the beginning of the file data area 1804, and the VMG 1700 is followed by a Video Title Set (hereinafter, referred to as the "VTS"). The VMG1700 includes Video Manager Information (hereinafter, referred to as the "VMGI") 1900, a Video Object Set for VMG Menu (hereinafter, referred to as the "VMGM_VOBS") 1901, and a VMGI (backup) 1902. The VMGI 1900 corresponds to the VIDEO_TS.IFO file 1702 described above. The VMGM_VOBS 1901, which is data for the title selection menu, corresponds to the VIDEO_TS.VOB file 1703, and the VMGI (backup) 1902 corresponds to the VIDEO_TS.BUP file 1704. In the VMG 1700, the VMGI 1900 is necessarily located at the beginning, and is followed by the VMGM_VOBS 1901 and the VMGI (backup) 1902 in this order. The VMGM_VOBS 1901 does not exist where there is no title selection menu.

Each VTS corresponds to a program (in FIG. 19, n number of programs are recorded). Hereinafter, a data structure of a VTS will be described using a VTS 1903. The following data included in the VTS 1903 corresponds to each data described above regarding FIG. 17. Video Title Set Information (hereinafter, referred to as the "VTSI") 1904 corresponds to a VTS_XX_X.IFO file. A Video Object Set for Titles in a VTS (hereinafter, referred to as the "VTSTT_VOBS") 1906 corresponds to a VTS_XX_X.VOB file. A VTSI (backup) 1907 corresponds to a VTS_XX_X.BUP file. A Video Object Set for the VTS Menu (hereinafter, referred to as the "VTSM_VOBS") 1905 is data for the program menu, and does not exist where there is no menu. In the VTS 1903, the VTSI 1904, the VTSM_VOBS 1905, the VTSTT_VOBS 1906, and the VTSI (backup) 1907 are located necessarily in this order. As described above, one feature of the DVD-Video format is that the positional arrangement of the data is restricted. The VTSTT_VOBS 1906 is a set of VOBs referred to as a "Video Object Set" (hereinafter, referred to as the "VOBS"), and includes AV data of the VTS.

Next, a data structure of a VOBS of the DVD-Video format will be described. FIG. 20 shows a data structure of a VOBS 2000. Hereinafter, a data structure of the VOBS 2000 will be described in detail using a VOB 2001 included in the VOBS 2000. The VOB 2001 includes VOBUs 2002 on a time series basis. Each VOBU 2002 includes a sequence of 2 kilobyte packs. Packs are classified into a V_PCK 2004 including picture data on the basis of a GOP unit, an A_PCK 2005 having audio data, a SP_PCK 2006 having sub picture data, and a navigation pack (NV_PCK) 2003 including reproduction time information and data search information.

In each VOBU, the NV_PCK 2003 located at the beginning, the V_PCK 2004, the A_PCK 2005 and the SP_PCK 2006 are multiplexed. The NV_PCK 2003 includes a Pack Header 2007 and a System Header 2008 which are conformed to the MPEG, and a PCI_PKT 2009 having reproduction control information and a DSI_PKT 2010 having data search information.

As described above, there are two different recording formats, i.e., the DVD-VR format and the DVD-Video format, for DVD-RW discs and DVD-R discs. Therefore, for example, for additionally recording AV data in accordance with the DVD-VR format on a DVD medium which already has AV data recorded thereon in accordance with the DVD-Video format (for example, for additionally recording on a DVD medium a copy-once program (a program which can be recorded only once), a bilingual program, etc. which is recordable only by the DVD-VR format), the logical format of the DVD media needs to be re-formatted in accordance with the DVD-VR format because of the difference between the formats. However, when the DVD media is re-formatted, the AV data which has been recorded on the DVD media is destroyed and cannot be reproduced.

As described above, when AV data needs to be recorded in accordance with one format on a recording medium which already has AV data recorded thereon in accordance with a different format, it is necessary to give up reproducing the already recorded AV data or to copy the already recorded AV data on a hard disc or the like so as to be recorded later on a different recording medium. The latter has problems of requiring extended time and also requiring a hard disc or the like to which the AV data can be temporarily saved.

SUMMARY OF THE INVENTION

Therefore, an object of the present invention is to provide a method for changing the logical format of a recording medium without erasing AV data which has already been recorded thereon, an information recording method for allowing such a format change, and an information reproduction method for reproducing AV data recorded on the recording medium after the format is changed.

A first aspect of the present invention is directed to an information recording method. The information recording method comprises a data length calculation step of calculating a data length which is sufficient both for recording, on the recording medium, volume structure information of the first format, file structure information of the first format and management information of the first format for managing all the video and/or audio information recorded on the recording medium, and for recording, on the recording medium, volume structure information of a second format, file structure information of the second format and management information of the second format for managing all the video and/or audio information recorded on the recording medium; a data area saving step of saving a data area having the data length calculated by the data length calculation step in advance at a predetermined position of the recording medium; a video and/or audio data recording step of recording the video and/or audio data in accordance with the first format, in an area of the recording medium other than the data area saved by the data area saving step; a second format management information recording step of recording the management information of the second format or data necessary for creating the management information of the second format, in a data area of the recording medium where the video and/or audio data is not recorded, as information for changing the first format into the second format; and a real time data information recording step of recording real time data information including reproduction time information, recording time information, display control information and copy control information for managing a video object unit included in the video and/or audio data of the second format, in a data area of the recording medium where the video and/or audio data is not recorded, wherein the real time data information is recorded in association with the video object of the first format and a video object unit included in the video object, and is recorded as information for changing the first format into the second format.

Preferably, the video and/or audio data recording step in the information recording method according to the first aspect of the present invention includes a video title set information recording step of recording video title set information for managing a video object included in the video and/or audio data of the first format, in the data area of the recording medium where the video and/or audio data is not recorded; and a program extent information recording step of recording program extent information including a recording position and a data length of the video and/or audio data in the recording medium and a recording position and a data length of the video title set information in the recording medium.

Preferably, the information recording method according to the first aspect of the present invention further comprises a navigation data information saving step of recording navigation data information including reproduction control information and data search information for managing the video object unit of the first format, in a data area of the recording medium where the video and/or audio data is not recorded, wherein the navigation data information is recorded in association with the video object of the first format and the video object unit included in the video object, and is recorded as information for changing the second format into the first format.

Preferably, the information recording method according to the first aspect of the present invention further comprises a second format file structure creation step of creating a file structure of the second format, such that the real time data information is located at the position of the navigation data information including the reproduction control information and the data search information for managing the video object unit of the first format.

Preferably, the information recording method according to the first aspect of the present invention further comprises an unallocated recording area setting step of setting the data area where the video title set information is recorded as an unallocated recording area.

Preferably, the information recording method according to the first aspect of the present invention further comprises a format management flag creation step of creating a format management flag which indicates that the video and/or audio data is recorded in accordance with the first format; and a format management flag recording step of recording the format management flag on the recording medium.

A second aspect of the present invention is directed to a format changing method. The format changing method performs the following steps on the following recording medium. The recording medium has a data area having a data length saved in advance which is sufficient both for recording, on the recording medium, volume structure information of the second format, file structure information of the second format and management information of the second format for managing all the video and/or audio information recorded on the recording medium, and the recording medium also has recorded thereon the video and/or audio data of the first format, the management information of the second format or data necessary for creating the management information of the second format, video title set information for managing a video object included in the video and/or audio data of the first format, program extent information including a recording position and a data length of the video and/or audio data of the first format in the recording medium and a recording position and a data length of the video title set information in the recording medium, and real time data information including reproduction time information, recording time information, display control information and copy control information for managing a video object unit included in video and/or audio data of the second format. The format changing method comprises a second format file structure information creation step of creating file structure information for reproducing the video and/or audio data of the first format as the video and/or audio data of the second format based on the program extent information; a second format information creation step of creating volume structure information of the second format and file structure information other than the file structure information created by the second format file structure information creation step, and when the recording medium does not have the management information of the second format recorded thereon, of further creating the management information of the second format based on the data necessary for creating the management information of the second format; a second format information recording step of recording the volume structure information, the file structure information and the management information of the second format in the saved data area; and a navigation data information rewriting step of rewriting the navigation data information including the reproduction control information and the data search information for managing the video object unit included in the video object of the first format with the real time data information.

A third aspect of the present invention is directed to a format changing method. The format changing method performs the following step on the following recording medium. The recording medium has recorded there on volume structure information of the second format, file structure information of the second format and management information of the second format for managing all the video and/or audio information recorded on the recording medium, video title set information for managing a video object included in video and/or audio data of the first format, program extent information including a recording position and a data length of the video and/or audio data of the first format in the recording medium and a recording position and a data length of the video title set information in the recording medium, and first navigation data information including reproduction time information and data search information, wherein the first navigation data information is in a data area where the video and/or audio data is not recorded. In the recording medium, second navigation data information included in the video and/or audio data of the first format has already been rewritten with real time data information including reproduction time information, recording time information, display control information and copy control information of a video object unit included in the video and/or audio data of the second format. The format changing method comprises a navigation data information restoring step of restoring the second navigation data information which has once been rewritten with the real time data information, based on the first navigation data information.

A fourth aspect of the present invention is directed to an information reproduction method. The information reproduction method performs the following steps on the following recording medium. The recording medium has recorded thereon volume structure information of the second format, file structure information of the second format, and management information of the second format for managing all the video and/or audio data recorded on the recording medium, video title set information for managing a video object included in video and/or audio data of a first format, program extent information including a recording position and a data length of the video and/or audio data of the first format in the recording medium and a recording position and a data length of the video title set information in the recording medium, and a format management flag which indicates that the video and/or audio data is recorded in accordance with the first format. The information reproduction method comprises a format management flag confirmation step of confirming the format management flag before reproduction; and a reproduction step of, when the format management flag is confirmed to be effective by the format management flag confirmation step, reproducing the video and/or audio data in accordance with the first format.

According to an information recording method of the first aspect of the present invention, a recording medium having video and/or audio data recorded thereon in accordance with the first format is created. The recording medium has recorded thereon the video and/or audio data and management information conformed to the first format, and also management information of all the video and/or audio data conformed to the second format and real time data information, which is management information of a video object unit of the second format. Therefore, the first format can be changed into the second format without erasing the video and/or audio data recorded on the recording medium.

According to a format changing method of the second aspect of the present invention, the format of the recording medium created by the information recording method according to the first aspect of the present invention can be changed. The format change allows the first format of the recording medium into the second format without erasing the video and/or audio data recorded in accordance with the first format. On the recording medium after the first format thereof is changed into the second format, video and/or audio data can be recorded in accordance with the second format.

According to a format changing method of the third aspect of the present invention, after the first format of the recording medium is changed into the second format by the format changing method according to the second aspect of the present invention, the format of the recording medium can be changed back to the first format.

According to an information reproduction method of the fourth aspect of the present invention, the format of the recording medium can be changed into the second format without erasing the video and/or audio data recorded in accordance with the first format. In addition, even after the format of the recording medium is changed into the second format, the video and/or audio data recorded on the recording medium can be reproduced as the video and/or audio data conformed to the first format. This information reproduction method does not require a complicated information recording method or format changing method, and simplifies the structure of the apparatus and the program for controlling the apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A shows a physical data structure of a DVD medium in the state before the recording in accordance with the DVD-Video format is started;

FIG. 2B shows a physical data structure of a DVD medium in the state where the recording of stream data of a first program has been completed;

FIG. 2C shows a physical data structure of a DVD medium in the state where the recording of a VTSI backup of the first program has been completed;

FIG. 2D shows a physical data structure of a DVD medium in the state where the recording of VTSI of the first program has been completed;

FIG. 2E shows a physical data structure of a DVD medium in the state where the recording of stream data of a second program has been completed;

FIG. 2F shows a physical data structure of a DVD medium in the state where the recording of a VTSI backup of the second program has been completed;

FIG. 2G shows a physical data structure of a DVD medium in the state where the recording of VTSI of the second program has been completed;

FIG. 2H shows a physical data structure of a DVD medium in the state where the finalization has been completed;

FIG. 8 shows an RDI_PCK table recorded by the information recording method according to the first embodiment of the present invention;

FIG. 11 shows an NV_PCK table recorded by an information recording method according to the second embodiment of the present invention;

FIG. 12 shows a disc having data recorded thereon by the DVD-VR format together with a physical structure and a logical structure thereof;

DESCRIPTION OF THE PREFERRED EMBODIMENTS

Structure of the Apparatus Common to the Embodiments

Before describing various embodiments of the present invention in detail, a structure of a digital video recording apparatus which is used commonly in the embodiments will be described. The digital video recording apparatus is an apparatus for recording AV data using a DVD-RW disc, which is a rewritable DVD, as a recording medium.

Figure 1:
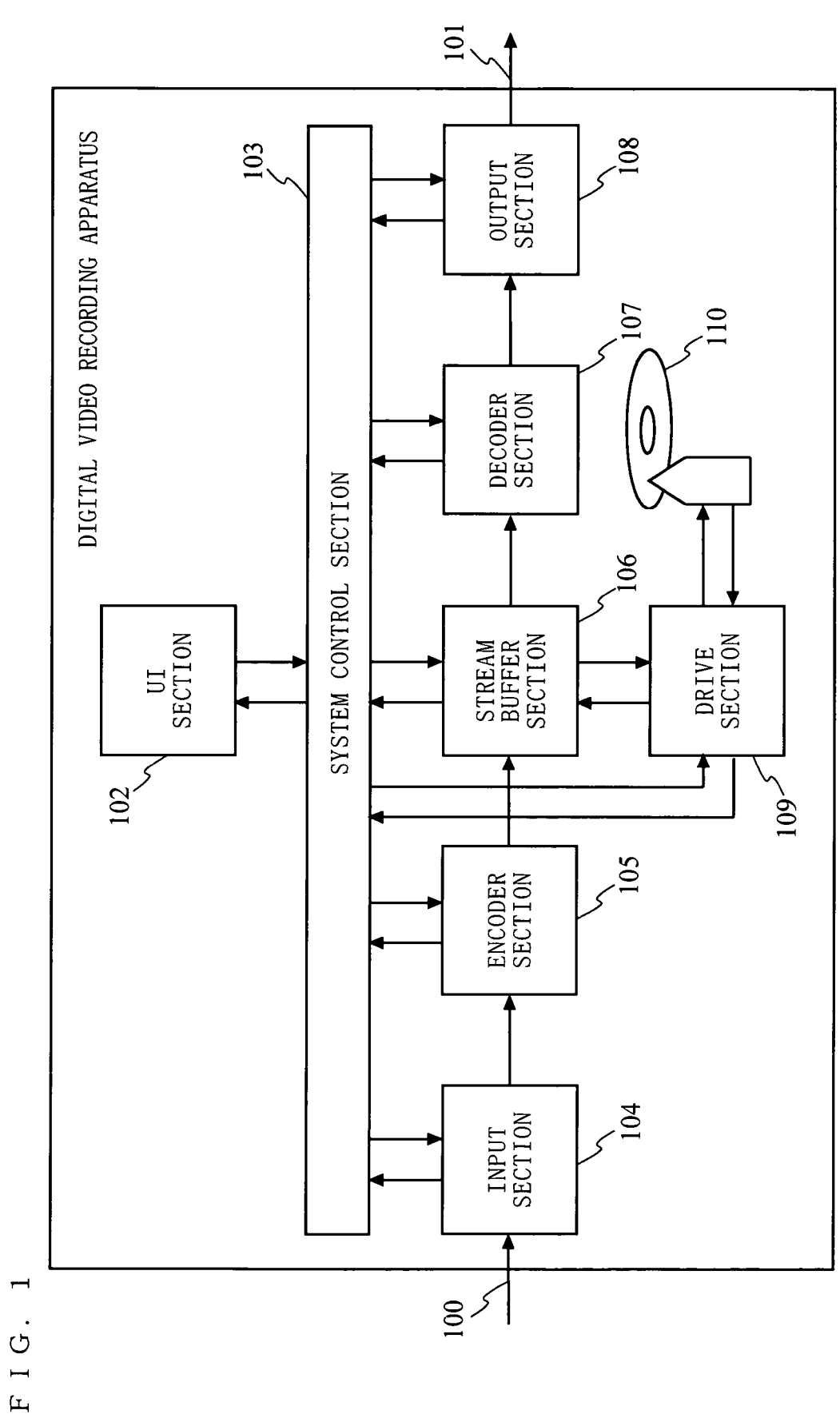
FIG. 1 is a block diagram of a digital video recording apparatus usable by an information recording method, a format changing method and an information reproduction method according to first through fifth embodiments of the present invention.

FIG. 1 is a block diagram of a digital video recording apparatus used in first through fifth embodiments described below. In FIG. 1, a user interface section (UI section) 102 includes an input device such as operation keys or the like and an output device such as a display device or the like. The UI section 102 receives an instruction from the user to start recording a program or to start reproducing a program, and outputs the received instruction to a system control section 103. An input section 104 converts an input signal 100 which is input via an external input terminal such as an antenna terminal, a video/audio input terminal or the like into digital data by an A/D converter, and outputs the digital data to an encoder section 105.

In response to an instruction from the system control section 103, the encoder section 105 performs an encoding process of the digital data which is output from the input section 104. The "encoding process" is a process of encoding digital data and thus generating a VOB in the form of a program stream conformed to MPEG2. The encoder section 105 generates VOBUs forming a VOB, and outputs the generated VOBUs to a stream buffer section 106. Each time the encoder section 105 generates a VOBU, the encoder section 105 also outputs VOBU information regarding the generated VOBU to the system control section 103. The encoder section 105 executes the above-described encoding process repeatedly until receiving an instruction to stop encoding from the system control section 103. The "VOBU" information includes, for example, the time to start reproduction of a video frame in the VOBU (VOBU_S_PTM), the size of the first I picture counted from the beginning of the VOBU (Reference_Picture_Size), the size of the VOBU (VOBU_Size), the reproduction time (PB_Time), the aspect ratio, the audio mode, and the number of audio streams.

The stream buffer section 106 includes a buffer, a writing and reading control program and the like. In response to an instruction from the system control section 103, the stream buffer section 106 performs writing and reading processes of VOBUs and management information. Specifically, when receiving an instruction to write a VOBU from the system control section 103, the stream buffer section 106 performs a VOBU writing process; and when receiving an instruction to read a VOBU from the system control section 103, the stream buffer section 106 performs a VOBU reading process. Similarly, when receiving an instruction to write management information from the system control section 103, the stream buffer section 106 performs a management information writing process; and when receiving an instruction to read management information from the system control section 103, the stream buffer section 106 performs a management information reading process.

The "VOBU writing process", which is performed by the stream buffer section 106, is a process of storing a VOBU which is output from the encoder section 105 in the buffer of the stream buffer section 106, then writing the stored VOBU onto a DVD-RW disc 110, and erasing the data stored in the buffer. When a writing error occurs while the VOBU is being written onto the DVD-RW disc 110, the stream buffer section 106 notifies the system control section 103 of the writing error. The "VOBU reading process", which is performed by the stream buffer section 106, is a process of reading a VOBU written on the DVD-RW disc 110, storing the read VOBU in the buffer of the stream buffer section 106, then outputting the VOBU stored in the buffer to a decoder section 107, and erasing the data stored in the buffer.

The "management information writing process", which is performed by the stream buffer section 106, is a process of writing management information which is output from the system control section 103 onto the DVD-RW disc 110 as a management information file. The "management information reading process", which is performed by the stream buffer section 106, is a process of reading management information stored on the DVD-RW disc 110 as the management information file and outputting reproduction control information included in the management information to the system control section 103. When no management information file is recorded on the DVD-RW disc 110, the stream buffer section 106 notifies the system control section of a reading error.

The management information includes reproduction control information calculated from the VOBU information which is input during recoding, and is recorded on the DVD-RW disc 110 as a management information file at the time when the recording is finished. The management information includes information for controlling the reproduction of the VOBU (or the VOB) recorded on the DVD-RW disc 110, and is referred to by the system control section 103 during the reproduction. The management information is recorded as the VR_MANGR.IFO file by the DVD-VR format, and as the VIDEO_TS.IFO file and the VTS_XX_X.IFO file by the DVD-Video format.

In response to an instruction from the system control section 103, the decoder section 107 performs a decoding process. The "decoding process" is a process of decoding original digital data from the VOBU which is output from the stream buffer section 106. The decoded digital data is output to an output section 108. The decoder section 107 performs the above-described decoding process repeatedly until receiving an instruction to stop the decoding from the system control section 103.

The output section 108 converts the digital data which is output from the decoder section 107 into an analog AV signal 101 by a D/A converter, and outputs the obtained AV signal 101 to a monitor or the like via an external output terminal such as a video/audio output terminal or the like.

Hereinafter, a recording operation of the digital video recording apparatus shown in FIG. 1 will be described. Here, an operation of recording data in accordance with the DVD-VR format will be described with reference to FIG. 1.

When an instruction to start recording a program is input from the UI section 102, the system control section 103 outputs a control signal to various sections in the digital video recording apparatus in order to start recording a video stream. The input signal 100 is converted from an analog signal into a digital signal by the input section 104 and is output to the encoder section 105. The encoder section 105 compresses the digital signal supplied from the input section 104 and outputs the compressed digital signal to the stream buffer section 106. The stream buffer section 106 temporarily accumulates compressed video streams or the like, and outputs the accumulated video streams or the like to a drive section 109. The information such as the video streams or the like is written on the DVD-RW disc 110 by the drive section 109 in a form conformed to the DVD-VR format. At this point, the system control section 103 designates a position in the DVD-RW disc 110 at which the information is to be written. With the DVD-VR format, a video stream is recorded as a VR_MOVIE.VRO file.

During the recording of a program, the system control section 103 is supplied with VOBU information for creating a management information file from the encoder section 105. With the DVD-VR format, a management information file is recorded as the VR_MANGR.IFO file. When the UI section 102 issues an instruction to stop recording the program, the system control section 103 stops recording the video stream. Finally, the management information file is recorded on the DVD-RW disc 110 by the drive section 109.

Next, a reproduction operation of the digital video recording apparatus shown in FIG. 1 will be described. When the UI section 102 instructs a reproduction operation, the system control section 103 outputs a control signal to various sections of the digital video recording apparatus in order to start reproduction. At the start of the reproduction, digital information (a compressed video stream, management information, etc.) is read from the DVD-RW disc 110 by the drive section 109. At this point, the stream buffer section 106 temporarily accumulates such information. The system control section 103 reads the information accumulated in the stream buffer section 106 on the basis of a decoding unit, and outputs the information to the decoder section 107. The compressed video stream or the like is decoded by the decoder section 107 and output to the output section 108. The output section 108 converts the decoded digital data into an analog AV signal 101 by D/A conversion, and outputs the obtained AV signal 101 to a monitor or the like via an external output terminal such as a video/audio terminal or the like.

With reference to FIG. 2A through FIG. 2H, a method for recording a program in accordance with the DVD-Video format will be described in detail. This recording method is conventionally used, but will be described herein since it is used by the present invention in an AV data recording process (or a DVD-Video format recording process in the detailed description in the first embodiment) described below.

FIG. 2A through FIG. 2H each show a physical data structure of a DVD-RW disc in accordance with the DVD-Video format. More specifically, FIG. 2A shows a state before the recording is started. FIG. 2B shows a state where the recording of stream data of a first program has been completed. FIG. 2C shows a state where the recording of a VTSI backup of the first program has been completed. FIG. 2D shows a state where the recording of VTSI of the first program has been completed. FIG. 2E shows a state where the recording of stream data of a second program has been completed. FIG. 2F shows a state where the recording of a VTSI backup of the second program has been completed. FIG. 2G shows a state where the recording of VTSI of the second program has been completed. FIG. 2H shows a state where the finalization has been completed.

For recording a program on a DVD-RW disc in accordance with the DVD-Video format, at least the following points need to be considered with respect to the recording of data and management information. Firstly, the content and the size of a volume structure and file structure 201 of the disc and the content and the size of a VMG 202, which is management information of all the AV data to be recorded on the disc, are determined only after all the programs are recorded. Nonetheless, by the DVD-Video format, such information is regulated to be recorded at the beginning of the user data area of the disc.

In order to record the volume structure and file structure 201 and the VMG 202, the size of which is determined only after all the programs are recorded, at the beginning of the user data area of the disc, a data area having a fixed length is saved in advance at a predetermined position in a forward area of the disc in an initial state where no program is recorded. This data area is saved for recording the volume structure and file structure 201 and the VMG 202 later. The programs are recorded rearward to the saved data area. The volume structure and file structure 201, the VMG 202 and the like are recorded by finalizing the disc after all the programs are recorded.

Secondly, the VTSI is management information of each program, and therefore the content and the size thereof are determined only after the respective program is recorded. Nonetheless, by the DVD-Video format, VTSI 204 is regulated to be recorded forward to a VTSTT_VOBS (represented simply as the "VOBS" in FIG. 2A through FIG. 2H) of the program to be recorded. In order to record the VTSI 204, the size of which is determined only after the program is recorded, in an area forward to the VOBS 205 of the program, a data area having a predetermined size is saved in advance.

A recording operation in accordance with the DVD-Video format having the above-described restrictions on the recording positions of the management information and the like will be described with reference to FIG. 2A through FIG. 2H. When an instruction to start recording a program is issued by the UI section 102, a data area for recording the volume structure and file structure 201 of the disc and the VMG 202 (a hatched areas 209 in FIG. 2A) is saved at the beginning of the volume. Then, the recording of the VOBS 205, which is a video stream of the program, is started. When the recording of the VOBS 205 is finished (FIG. 2B), the VTSI 204 is determined, and a VTSI backup 206 is recorded in a data area rearward to the VOBS 205 (FIG. 2C). In addition, the VTSI 204 is recorded in the data area saved in advance (a hatched area 210 in FIG. 2B) (FIG. 2D). By the above-described procedure, the recording of the program is finished. Additional recording of other programs is performed by repeating the above-described procedure (FIG. 2E through FIG. 2G).

In order to reproduce a program (i.e., in order to access a VTS), pointer information recorded in the VMG 202 is necessary. As described above, the VMG 202 is recorded by finalizing the disc after all the programs are recorded on the disc. As information used for accessing the VTS while the VMG 202 has not been recorded, location information of each VTS, i.e., program extent information 203, is recorded or updated after the recording of each program is finished (FIG. 2D). By the program extent information 203 being recorded in a data area indicated by a fixed address or a physical address obtained from the drive section 109, the corresponding VTS becomes accessible based on the program extent information 203 and thus the corresponding program becomes reproducible.

As described above, the contents of the volume structure and file structure 201 and the VMG 202 are determined at the time when it is established that no more program will be recorded on the disc. When the disc is finalized, the volume structure and file structure 201 and the VMG 202 are recorded in the data area saved in advance, and an anchor 207 which is an anchor volume descriptor pointer of the file system is recorded in a data area adjacent to an end address of the volume (user data area) of the disc. Finally, the drive section 109 closes the physical volume, and thus a lead-in area 200 and a lead-out area 208 are recorded (FIG. 2H). By the above-described finalization, the recording process by the DVD-Video format is finished.

The data in accordance with the DVD-Video format and the data in accordance with the DVD-VR format described above cannot be recorded on the same disc together. Therefore, the user needs to select either recording format when recording programs on the disc. Namely, it is impossible to record AV data in accordance with the DVD-VR format on a DVD medium which already has AV data recorded thereon in accordance with the DVD-Video format, due to the difference between the formats.

Hereinafter, a format changing method for allowing AV data to be recorded in accordance with the DVD-VR format on a DVD medium which already has AV data recorded thereon in accordance with the DVD-Video format will be described. Specifically, this is made possible by a format changing method for changing the logical format of the DVD medium to the DVD-VR format without erasing the AV data recorded on the DVD medium in accordance with the DVD-Video format. In the following, an information recording method for allowing such a format change, and an information reproduction method for reproducing the AV data recorded on the DVD medium after the format is changed, will also be described.

First Embodiment

Hereinafter, an information recording method and a format changing method according to a first embodiment of the present invention will be described with reference to FIG. 3A and FIG. 3B. The information recording method and the format changing method according to this embodiment are performed using the digital video recording apparatus shown in FIG. 1.

Figure 3A:
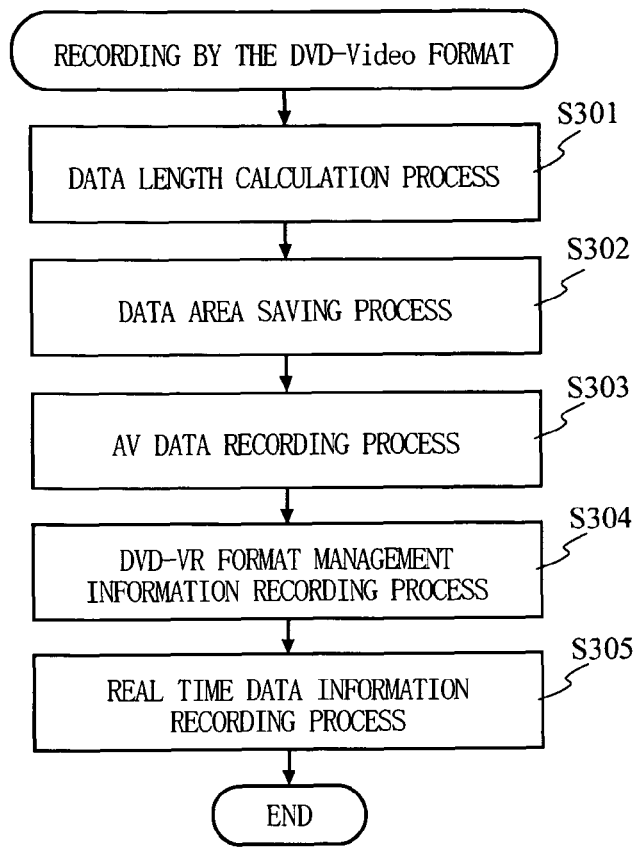
FIG. 3A is a flowchart illustrating an information recording method according to the first embodiment of the present invention.
Figure 3B:
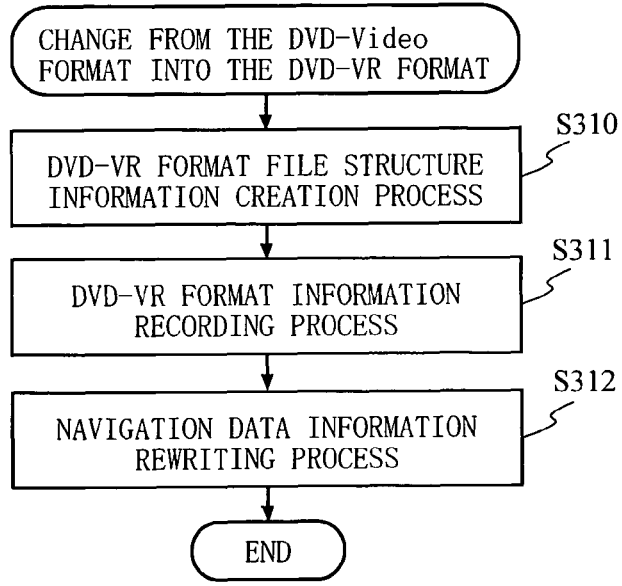
FIG. 3B is a flowchart illustrating a format changing method according to the first embodiment of the present invention.
Figure 4:
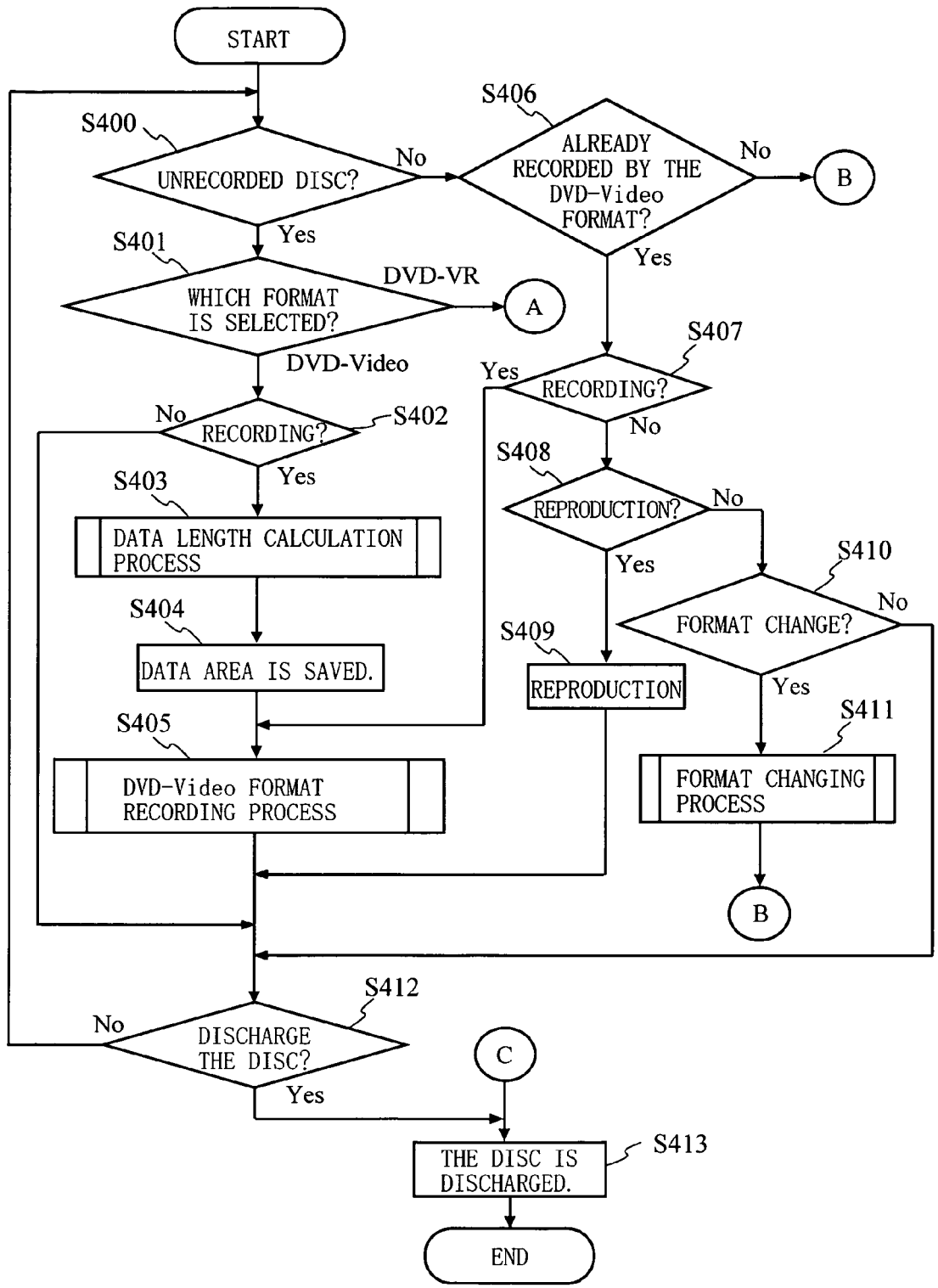
FIG. 4 is a flowchart illustrating the information recording method, the format changing method, and the information reproduction method according to the first embodiment of the present invention.

FIG. 3A is a flowchart illustrating an information recording method according to this embodiment. The procedure shown in FIG. 3A is executed on a DVD-RW disc (hereinafter, referred to simply as the "disc") having no data recorded thereon. By executing steps S301 through S305 shown in FIG. 3A, a disc having a program recorded thereon in accordance with the DVD-Video format is created. The format of the disc can be changed into the DVD-VR format by a format changing method described later.

Steps S301 through S305 will be described in detail. First, in a data length calculation process (step S301), a sum of the sizes of the volume structure, the file structure, the management information and the like of the DVD-Video format, and a sum of the sizes of the volume structure, the file structure, the management information and the like of the DVD-VR format, are calculated by the system control section 103, before the recording on the disc is started. Next, in a data area saving process (S302), a data area having a size corresponding to a larger sum among the above-mentioned sums is saved at the beginning of the volume of the disc. Next, in an AV data recording process (step S303), AV data, management information (VTSI, program extent information, etc.) and the like are recorded on the disc in accordance with the DVD-Video format.

Next, in a DVD-VR format management information recording process (step S304), the management information by the DVD-VR format, i.e., the VR_MANGR.IFO file, is recorded in a part of the user data area other than the area where the AV data is recorded and the data area saved in step S301. Alternatively, data which is necessary for creating the VR_MANGR.IFO file later may be recorded in the above-described area instead of the VR_MANGR.IFO file. Finally, in a real time data information recording process (step S305), an RDI_PCK, which is real time data information for managing a VOBU of the DVD-VR format, is associated with the corresponding VOB and VOBU, and is recorded as a table in a part of the data area other than the area where the AV data is recorded and the data area saved in step S301.

By a program being recorded on the disc in accordance with the above-described procedure, a disc reproducible in accordance with the DVD-Video format is created. In addition, the disc has a feature in that the format thereof can be changed into the DVD-VR format without erasing the program recorded thereon. The data on the disc is reproduced by referring to the VTSI and the program extent information. Alternatively, in the case where the VR_MANGR.IFO file, which is the management information by the DVD-VR format, is recorded in step S304, the data on the disc can be reproduced using the VR_MANGR.IFO file as the management information.

Next, a format changing method according to this embodiment will be described. FIG. 3B is a flowchart illustrating a format changing method according to this embodiment. The procedure shown in FIG. 3B is executed on the disc having a program recorded thereon by the method shown in FIG. 3A. According to the procedure shown in FIG. 3B, by executing steps S310 through S312, the format of the disc having the program recorded thereon by steps S301 through S305 is changed into the DVD-VR format.

Steps S310 through S312 will be described in detail. First, in a DVD-VR format file structure information creation process (step S310), a file entry including information on the start address and the data length of each piece of AV data recorded on the disc by the method shown in FIG. 3A is created by the system control section 103. Next, in a DVD-VR format information recording process (step S311), the volume structure, the file structure, the management information and the like of the DVD-VR format are recorded in the data area saved in step S301. In the case where the VR_MANGR.IFO file is not recorded in step S304, the VR_MANGR.IFO file is recorded in step S311. Finally, in a navigation data information rewriting process (step S312), the NV_PCK for managing the VOBU by the DVD-Video format is rewritten with the corresponding RDI_PCK based on the table having the information on the RDI_PCK.

By the above-described procedure, the DVD-Video format in accordance with which the data has been recorded on the disc is changed into the DVD-VR format. The post-format change disc is reproduced based on the VR_MANGR.IFO file, which is the management information file of the DVD-VR format.

With reference to FIG. 4 through FIG. 9, the information recording method and the format changing method according to this embodiment will be described in more detail. FIG. 4 through FIG. 9 are flowcharts illustrating the information recording method and the format changing method according to this embodiment in detail.

When a disc is mounted on the digital video recording apparatus shown in FIG. 1, the system control section 103 first checks whether the disc is an unrecorded disc or not (step S400). When no data is recorded on the disc ("Yes" in step S400), the user issues an instruction on the recording format via the UI section 102. When it is selected by the user to record a program in accordance with the DVD-Video format ("DVD-Video" in step S401 and "Yes" in step S402), the system control section 103 calculates the data length of the area to be saved at the beginning of the volume by the data length calculation process described below (step S403), and saves a data area having the calculated data length at the beginning of the volume (step S404).

Next, the system control section 103 records AV data on the disc in accordance with the DVD-Video format recording process (step S405).

When an instruction is issued from the user to additionally record another program on the disc which already has a program recorded by the DVD-Video format ("Yes" in step S406) via the UI section 102 ("Yes" in step S407), the system control section 103 performs the DVD-Video format recording process (step S405). When an instruction is issued from the user to reproduce a program recorded on such a disc ("Yes" in S408), the system control section 103 reproduces the program based on the program extent information and the VTSI or based on the VR_MANGR.IFO file (step S409).

When an instruction is issued from the user to change the format via the UI section 102 ("Yes" in step S410), the system control section 103 starts changing the DVD-Video format into the DVD-VR format by the format changing process described below (step S411). For recording, for example, a copy-once program or a bilingual program which is recordable only by the DVD-VR format, the change of the format may be automatically performed by the system control section 103.

Figure 5A:
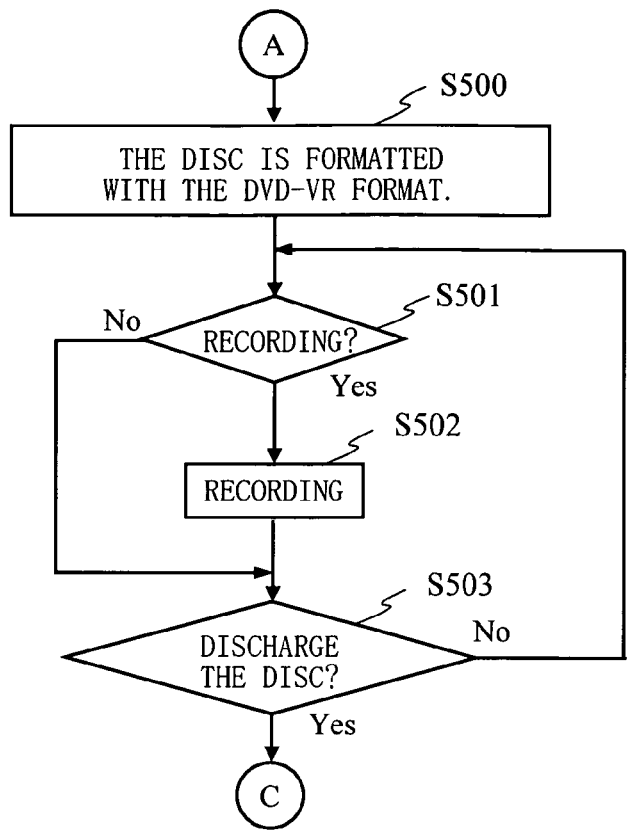
FIG. 5A is a flowchart illustrating a part of the information recording method in accordance with the DVD-VR format according to the first embodiment of the present invention.
Figure 5B:
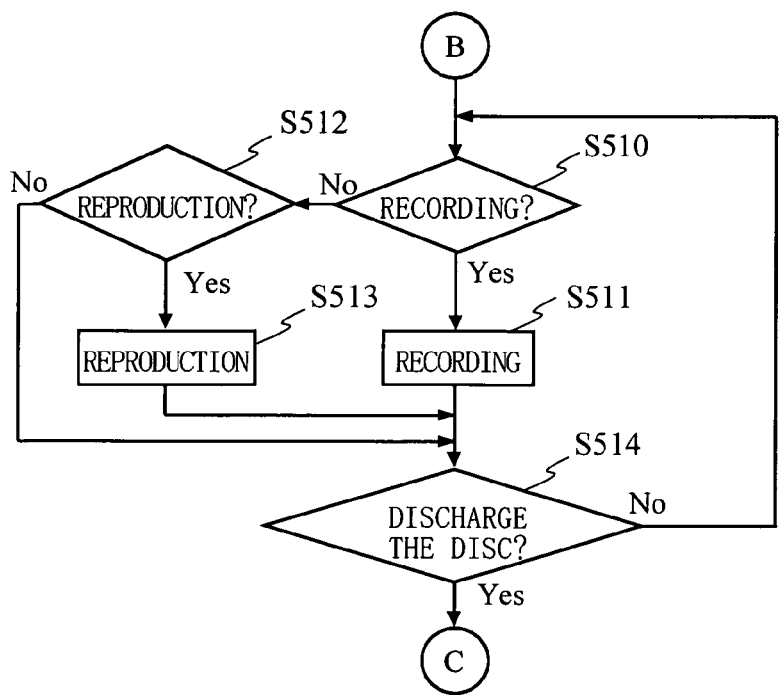
FIG. 5B is a flowchart illustrating another part of the information reproduction method in accordance with the DVD-VR format according to the first embodiment of the present invention.

When the user selects the DVD-VR format in step S401, the procedure advances to step S500 shown in FIG. 5A. The system control section 103 formats the disc in accordance with the DVD-VR format (step S500), and records a program in accordance with the DVD-VR format ("Yes" in step S501 and step S502).

When an instruction is issued from the user via the UI section 102 to record a program on the disc, the format of which has been changed into the DVD-VR format, or on the disc which already has a program recorded in accordance with the DVD-VR format ("Yes" in step S510 in FIG. 5B), the system control section 103 records the program in accordance with the DVD-VR format (step S511). When an instruction is issued from the user to reproduce a program recorded on such a disc ("Yes" in S512), the system control section 103 reproduces the program based on the VR_MANGR.IFO file (step S513).

When the recording on, the reproduction from, or change of the format of, the disc is finished and an instruction is issued from the user to discharge the disc via the UI section 102 ("Yes" in step S412, "Yes" in step S503, or "Yes" in step S514), the disc is discharged from the digital video recording apparatus (step S413).

Figure 6:
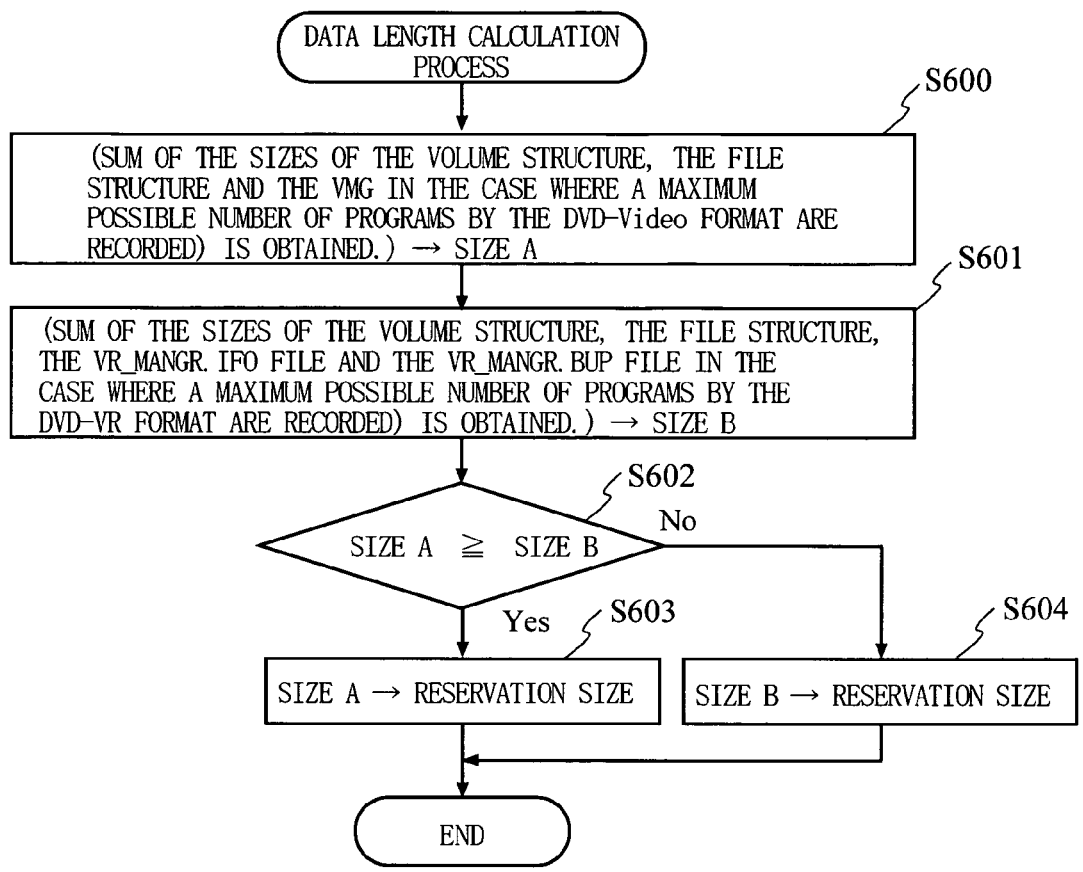
FIG. 6 is a flowchart illustrating a data length calculation process in the information recording method according to the first embodiment of the present invention.

With reference to FIG. 6, the data length calculation process will be described. The data length calculation process is performed as follows. First, the system control section 103 calculates a sum of the sizes of the volume structure, the file structure and the VMG in the case where a maximum possible number of programs in accordance with the DVD-Video format are recorded (step S600). (Hereinafter, the sum will be referred to as the "size A".) The system control section 103 also calculates a sum of the sizes of the volume structure, the file structure, the VR_MANGR.IFO file and the VR_MANGR.BUP in the case where a maximum possible number of programs in accordance with the DVD-VR format are recorded (step S601). (Hereinafter, the sum will be referred to as the "size B".) Finally, the size A and the size B are compared with each other (step S602), and a data area having a size corresponding to a larger sum is saved at the beginning of the volume of the disc (step S603, S604, and step S404 in FIG. 4). The sizes of the above-mentioned types of data, except for the VMG, are determined by the maximum possible number of programs and the file system of the respective recording format. The size of the VMG, which includes stream data for displaying the menu, and thus the size A, are determined by what type of menu is created by the instruction from the system or the user. The AV data of the program and the like are recorded in an area rearward to the saved data area.

Figure 7:
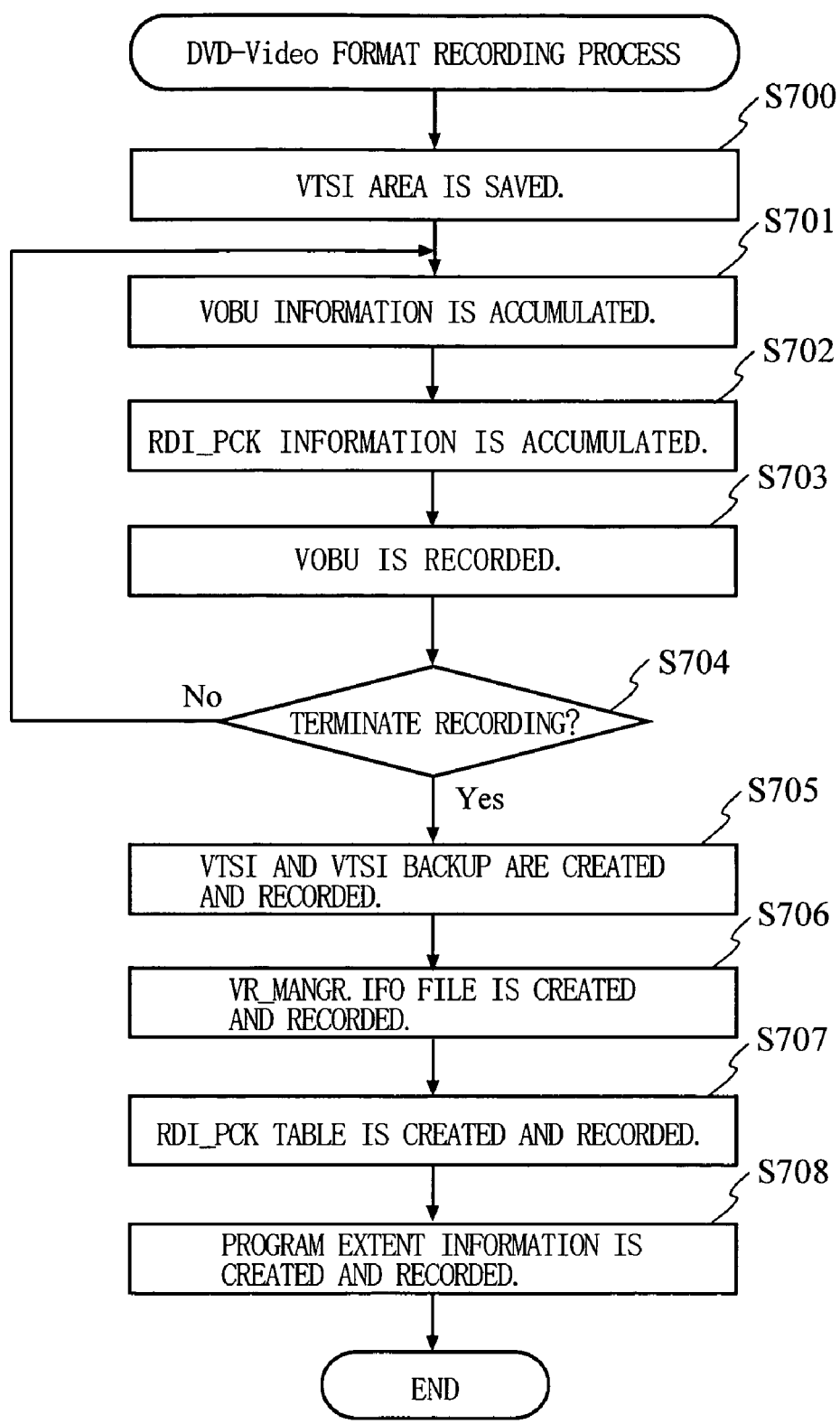
FIG. 7 is a flowchart illustrating a DVD-Video format recording process in the information recording method according to the first embodiment of the present invention.

With reference to FIG. 7, the DVD-Video format recording process will be described. The DVD-Video format recording process is performed as follows. First, the system control section 103 saves a data area for recording VTSI in the user data area of the disc (step S700). Next, the encoder section 105 starts encoding the digital data which is input from the input section 104 and thus generates a VOBU. The generated VOBU is output from the encoder section 105 to the stream buffer section 106. At the same time, the VOBU information on the VOBU which is output to the stream buffer section 106 is output from the encoder section 105 to the system control section 103. The VOBU information includes the VTSI and data of management information for the DVD-VR format. The system control section 103 accumulates the input VOBU information in a memory of the system control section 103 (step S701)

The system control section 103 is supplied by the encoder section 105 with the RDI_PCK information of each VOBU by the DVD-VR format. The supplied RDI_PCK information is associated with the corresponding VOB and VOBU by the system control section 103, and is accumulated as a table as shown in FIG. 8 in a memory of the system control section 103 (step S702). Finally, the system control section 103 instructs the stream buffer section 106 to write the VOBU on the disc, and the VOBU is recorded on the disc (step S703). The processes in steps S701 through S703 shown in FIG. 7 are repeated until the user issues an instruction to stop recording the program via the UI section 102 (step S704).

When the user issues an instruction to stop the recording via the UI section 102 ("Yes" in step S704), the system control section 103 creates VTSI and a VTSI backup based on the VOBU information accumulated in step S701 (step S705). The created VTSI is recorded in the data area saved in step S700, and the created VTSI backup is recorded in a data area rearward to the VTSTT_VOBS (step S705). By the VTSI and the VTSI backup being recorded, the recording of the VTS of the program is completed.

Next, the system control section 103 creates a management information file for the DVD-VR format (VR_MANGR.IFO file) based on the VOBU information accumulated in step S701 and records the VR_MANGR.IFO file on the disc (step S706). The VR_MANGR.IFO file is recorded in a data area in which the VTSI or the VTSTT_VOBS is not recorded, for example, in a data area adjacent to the VTS. Alternatively, the VR_MANGR.IFO file may be recorded in a data area in the VTS on the condition that the order of arrangement of the VTSI, the VTSTT_VOBS and the VTSI backup is not changed.

Next, the RDI_PCK information accumulated as a table in the memory of the system control section 103 in step S702 (see FIG. 8; hereinafter, referred to as the "RDI_PCK table") is recorded on the disc as a data file of a single extent (step S707). Finally, the information including the recording start address and the recording size of each of the VTSI, the VTSTT_VOBS and the VTSI backup is recorded in a predetermined data area (see FIG. 2A through FIG. 2H) as program extent information (step S708). Thus, the recording in accordance with the DVD-Video format is completed.

Figure 9:
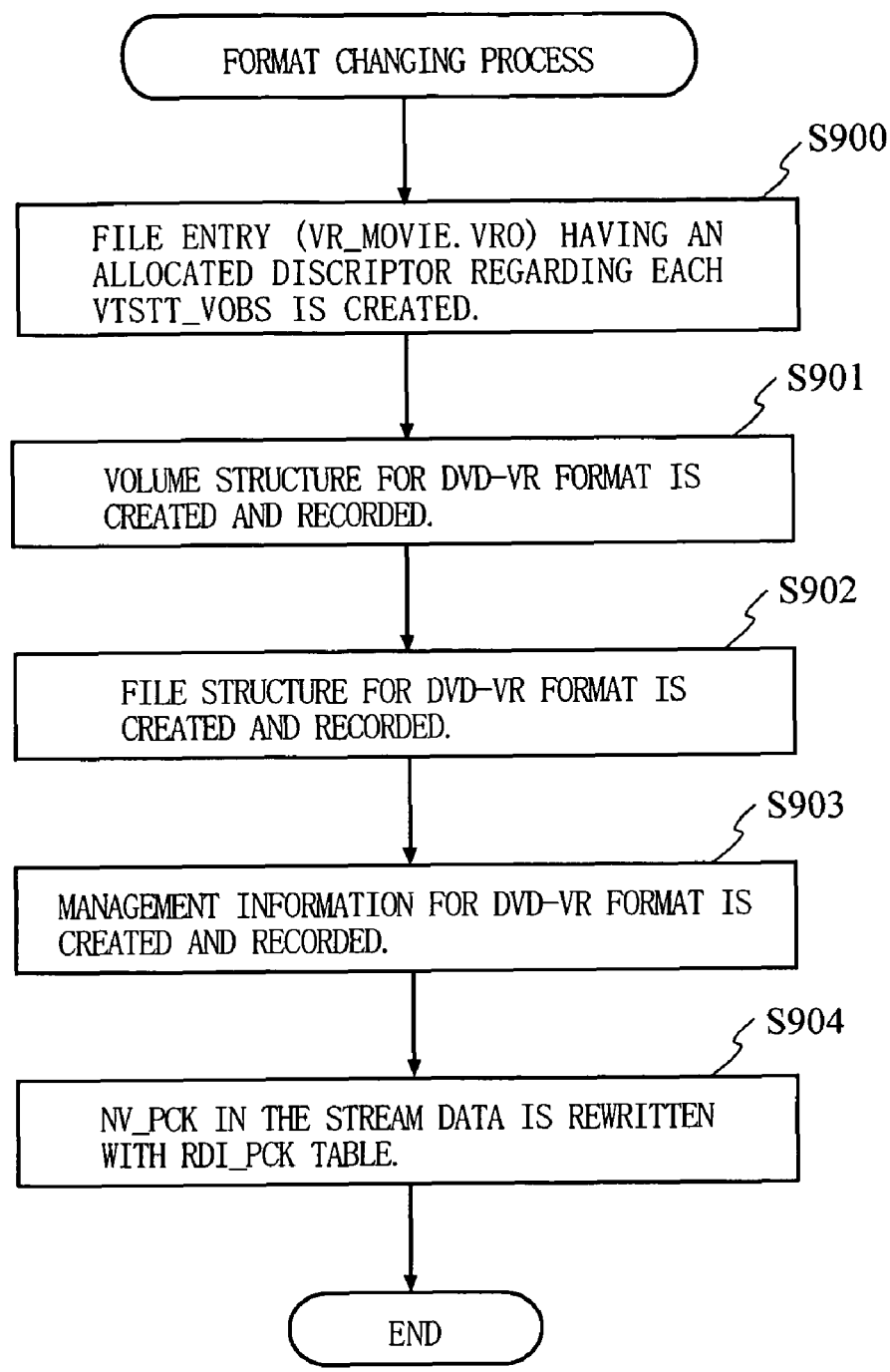
FIG. 9 is a flowchart illustrating a format changing process in the format changing method according to the first embodiment of the present invention.

With reference to FIG. 9, the format changing process will be described. The format changing process is performed as follows. First, the system control section 103 creates a file entry having an allocated descriptor regarding each of all the VTSTT_VOBSs included in an extent and recorded in accordance with the DVD-Video format (step S900). An "allocated descriptor" is information on a distributed area of a file to be recorded in the file entry, and specifically is a descriptor having information on the recording start address and the recording size of each distributed area.

Figure 13:
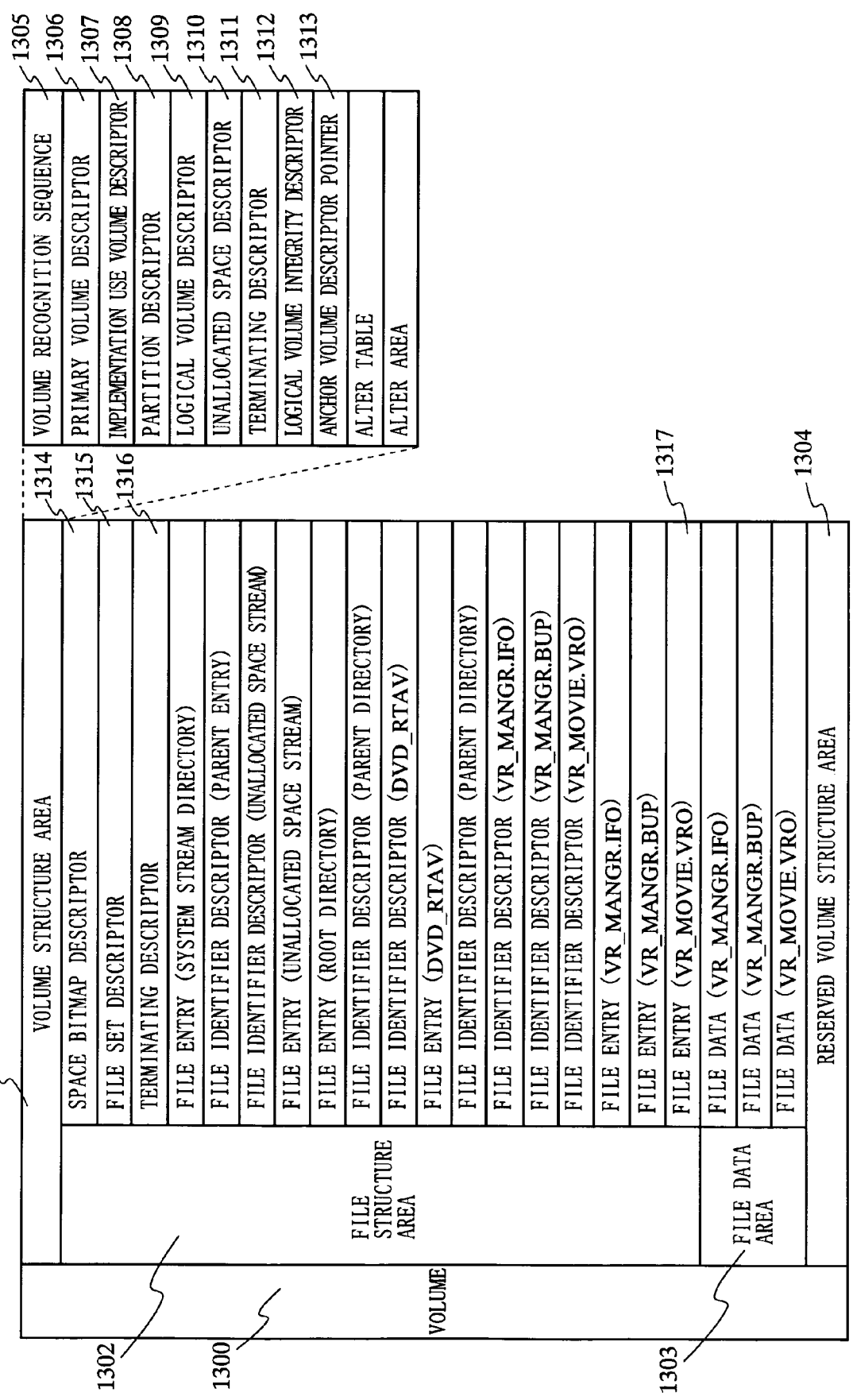
FIG. 13 shows a structure of a file system of the DVD-VR format.
Figure 14:
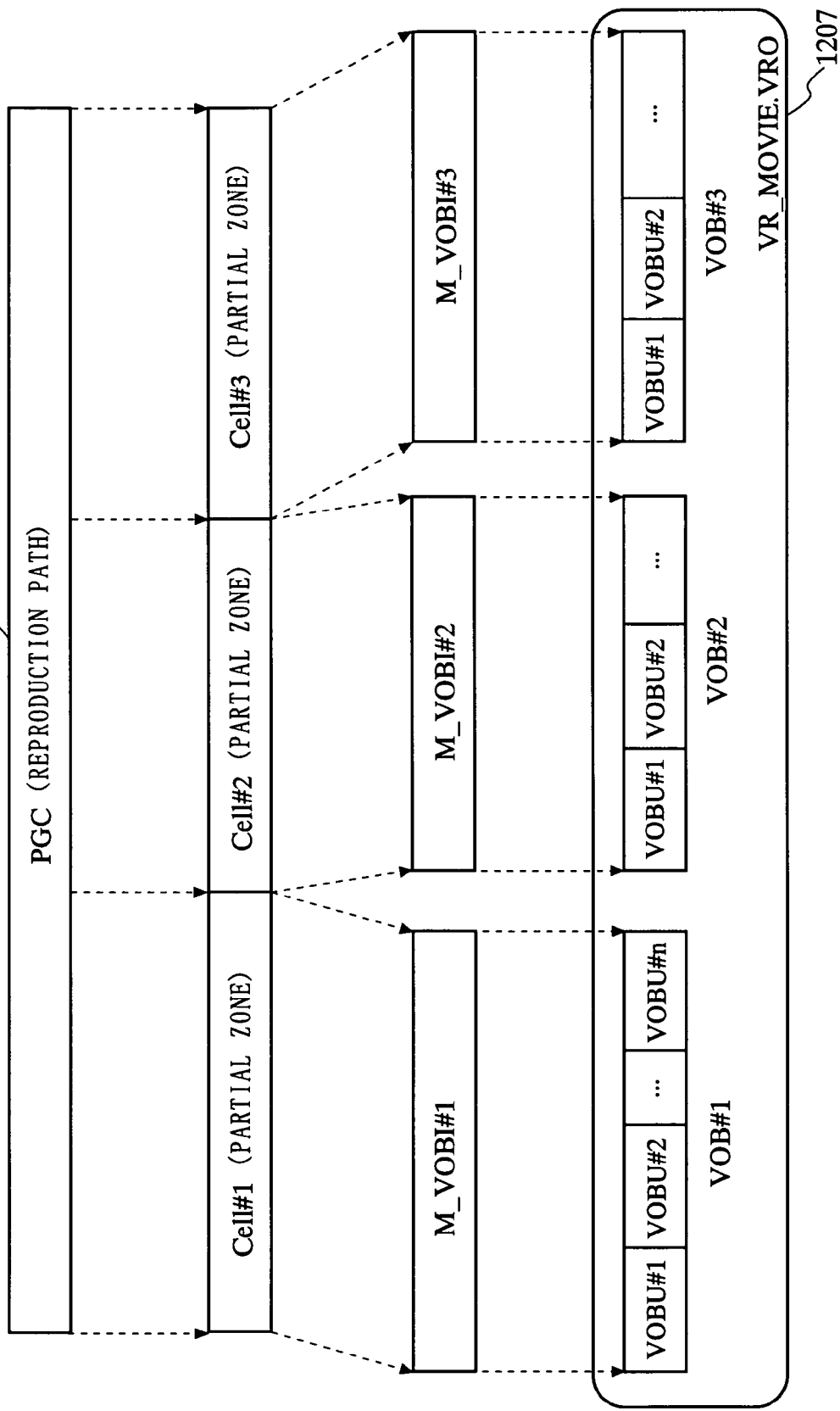
FIG. 14 shows a Program Chain structure of the DVD-VR format.
Figure 15:
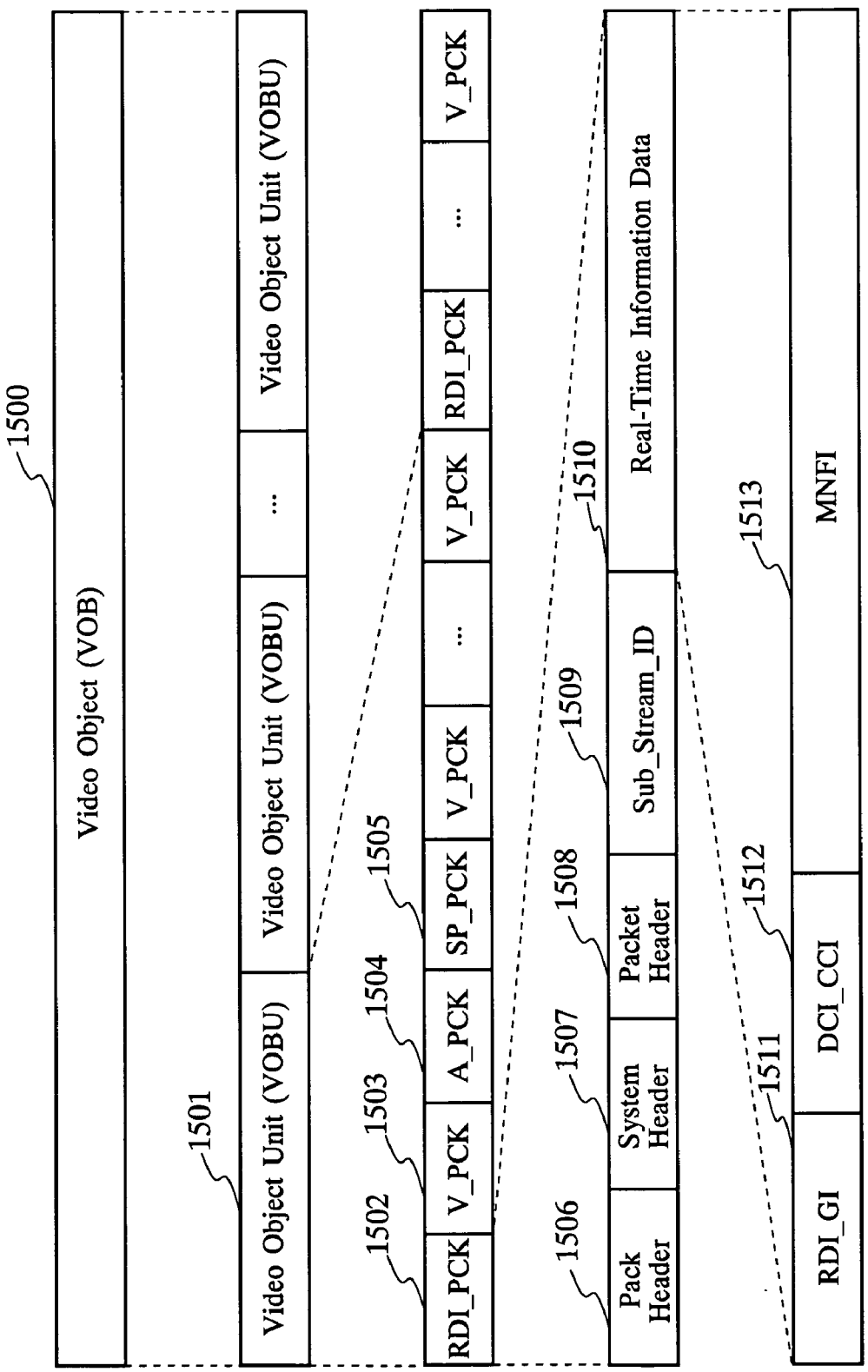
FIG. 15 shows a data structure of a VOB of the DVD-VR format.

Next, a volume structure for the DVD-VR format is created in accordance with the file system defined for the disc and recorded on the disc (step S901). A file structure of the DVD-VR format is also created in accordance with the file system defined for the disc and recorded on the disc (step S902). The file entry created in step S900 is recorded in the file structure created in step S902 as a file entry 1317 (see FIG. 13) of the VR_MOVIE.VRO. The VR_MANGR.IFO file recorded in step S706 of the DVD-Video format recording process is located in the file data area designated by the file structure for the DVD-VR format (step S903).

Figure 16:
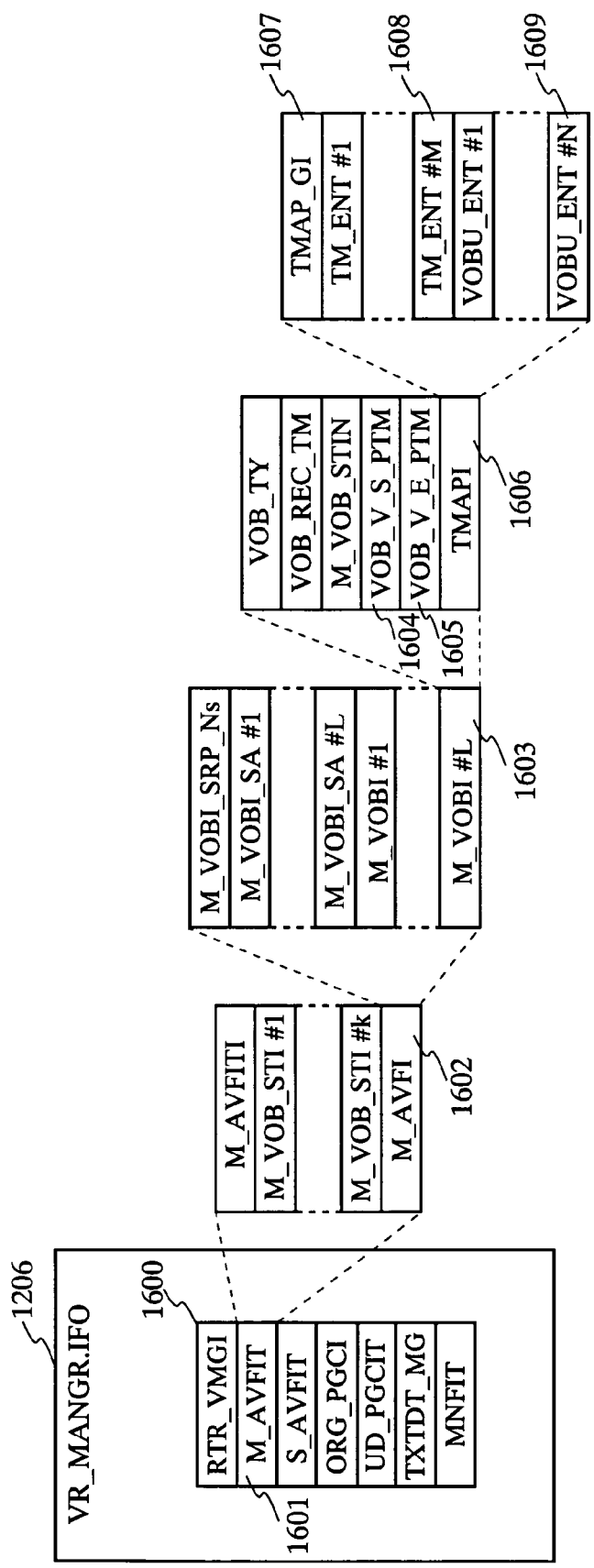
FIG. 16 shows a structure of a management information file of the DVD-VR format.
Figure 17:
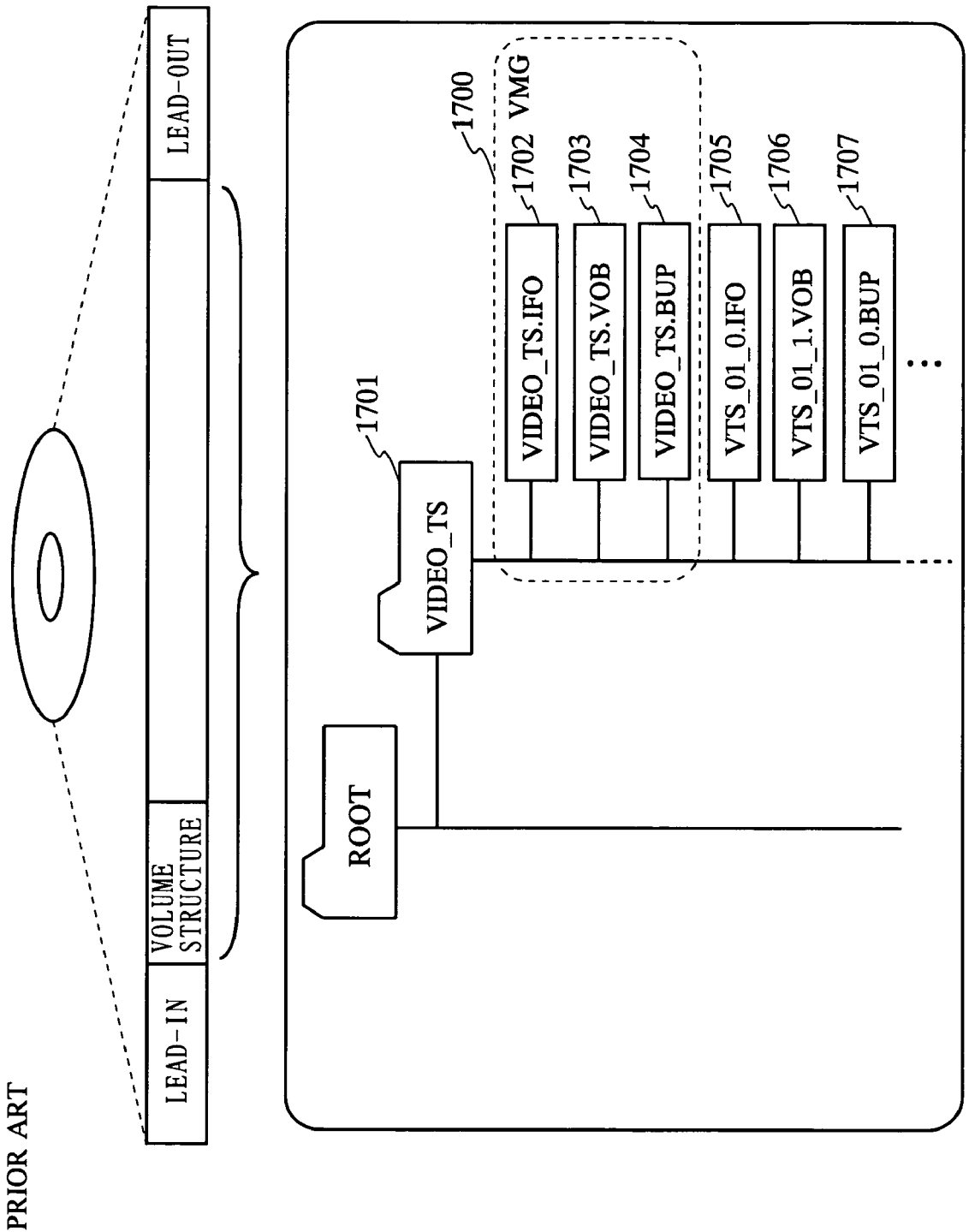
FIG. 17 shows a disc having data recorded thereon by the DVD-Video format together with a physical structure and a logical structure thereof.
Figure 18:
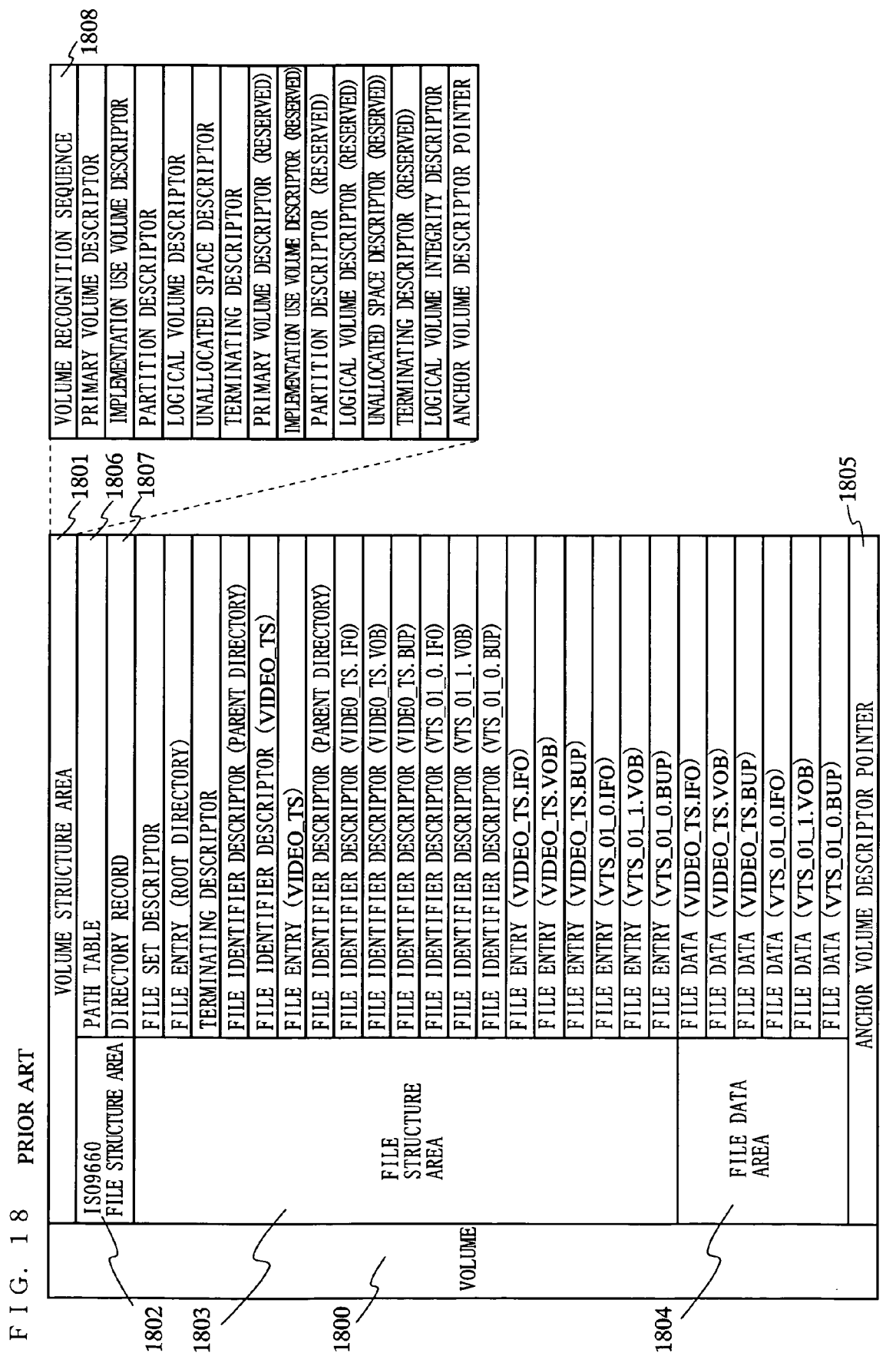
FIG. 18 shows a structure of a file system of the DVD-Video format.
Figure 19:
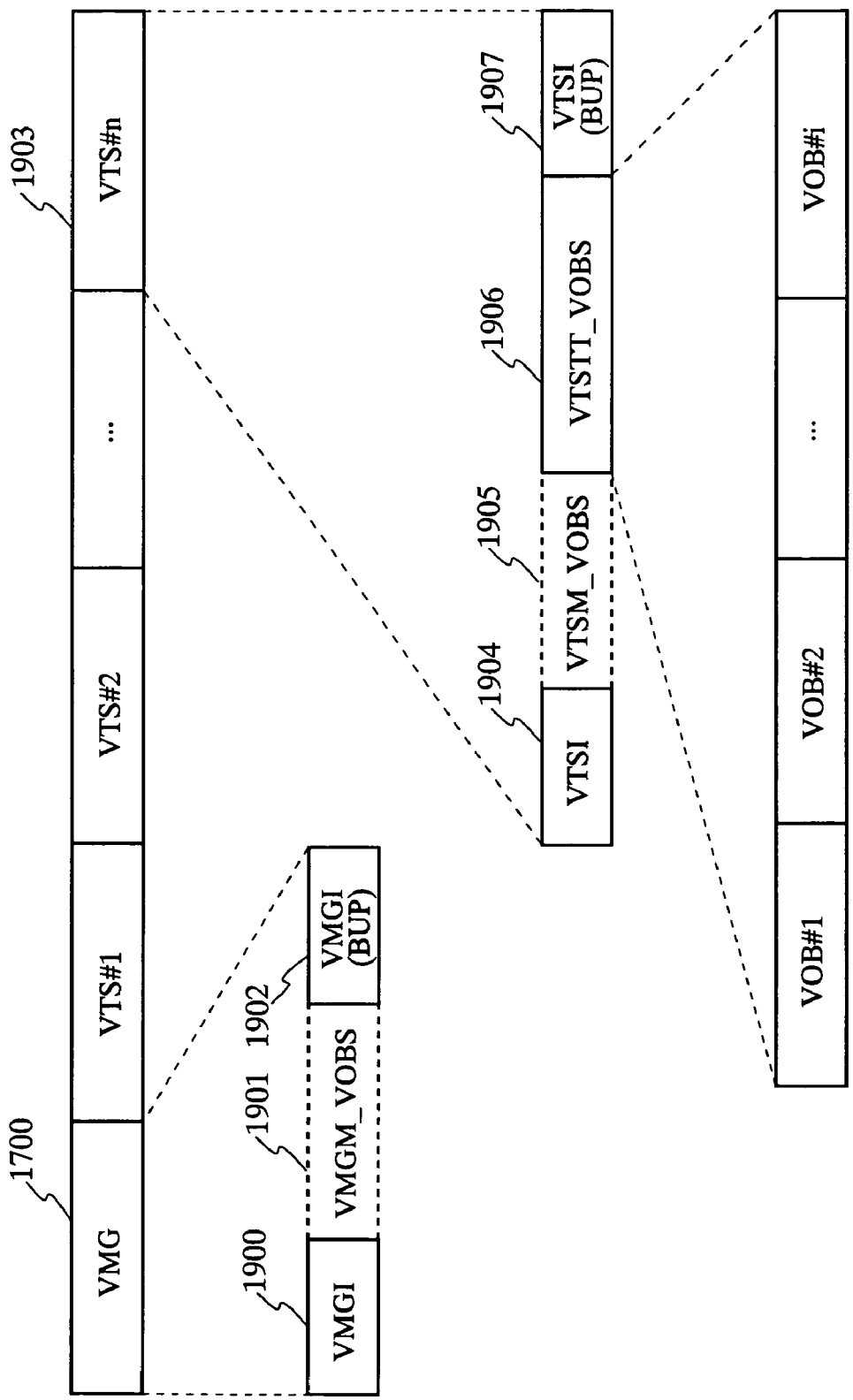
FIG. 19 shows a structure of file data and positional arrangement of the data of the DVD-Video format.
Figure 20:
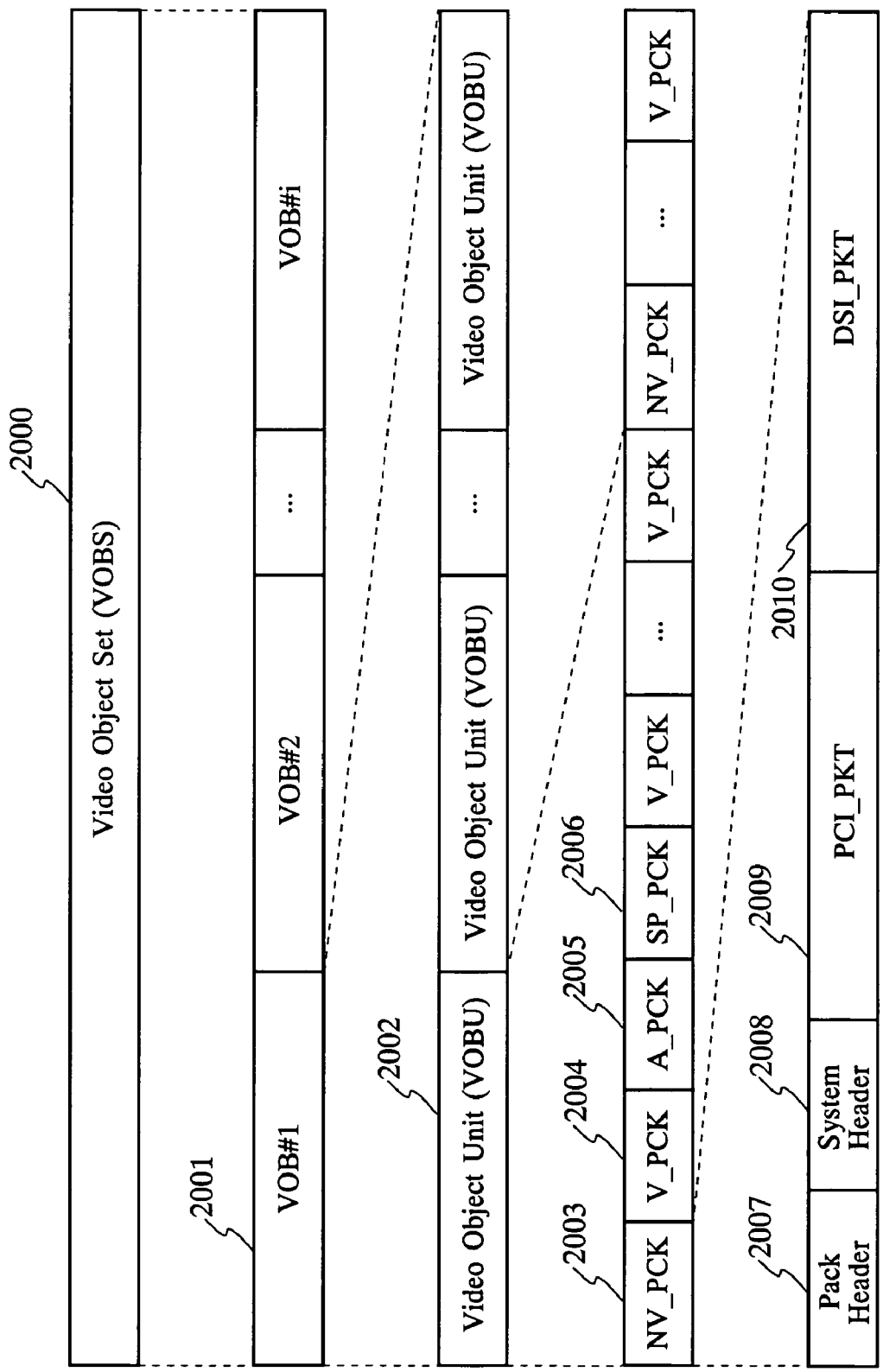
FIG. 20 shows a structure of a VOBS of the DVD-Video format.

Finally, the NV_PCK recorded at the beginning of each VOBU of the VTSTT_VOBS is rewritten with a corresponding RDI_PCK on the RDI_PCK table recorded on the disc in step S707 (step S904). The relative address of each VOBU in the VOB is confirmed by an ADR_OFS field (not shown) of a TMAP_GI (1607 in FIG. 16) and a VOBU_SZ field (not shown) of a VOBU_ENT (1609 in FIG. 16), both of the VR_MANGR.IFO file. The ADR_OFS field represents the start address of each VOB, and the VOBU_SZ field represents the size of each VOBU. By adding the ADR_OFS field and the VOBU_SZ field together, the recording address of each VOBU in the VOB can be confirmed. The recording start address of each VOB is confirmed based on the program extent information. Thus, the format changing process is completed.

As described above, according to the information recording method of this embodiment, a DVD medium having a program recorded thereon in accordance with the DVD-Video format is created. On this DVD medium, AV data and management information conformed to the DVD-Video format are recorded, and also a VR_MANGR.IFO file which is management information of the entire DVD medium by the DVD-VR format and an RDI_PCK which is management information of the VOBU by the DVD-VR format are recorded. Therefore, the DVD-Video format can be changed into the DVD-VR format.

According to the format changing method of this embodiment, the VR_MANGR.IFO file is set as the management information of the entire disc, the NV_PCK which is the management information of the VOBU of the DVD-Video format is rewritten with the RDI_PCK, and the volume structure and the file structure conformed to the DVD-VR format are recorded. By such processes, the format of the above-mentioned DVD medium is changed from the DVD-Video format into the DVD-VR format.

According to the information recording method and the format changing method of this embodiment, the logical format of a DVD medium having AV data recorded thereon in accordance with the DVD-Video format can be directly changed into the DVD-VR format. Therefore, AV data in accordance with the DVD-VR format (for example, a copy-once program or a bilingual program which is recorded only by the DVD-VR format) can be recorded on this DVD medium without erasing the AV data already recorded.

The data recorded in step S706 of the DVD-Video format recording process may be data of the management information for the DVD-VR format, instead of the VR_MANGR.IFO file. In this case, the VR_MANGR.IFO file is created based on the data of the management information in step S903 of the format changing process and is recorded in the data area designated by the file structure.

Second Embodiment

Figure 10:
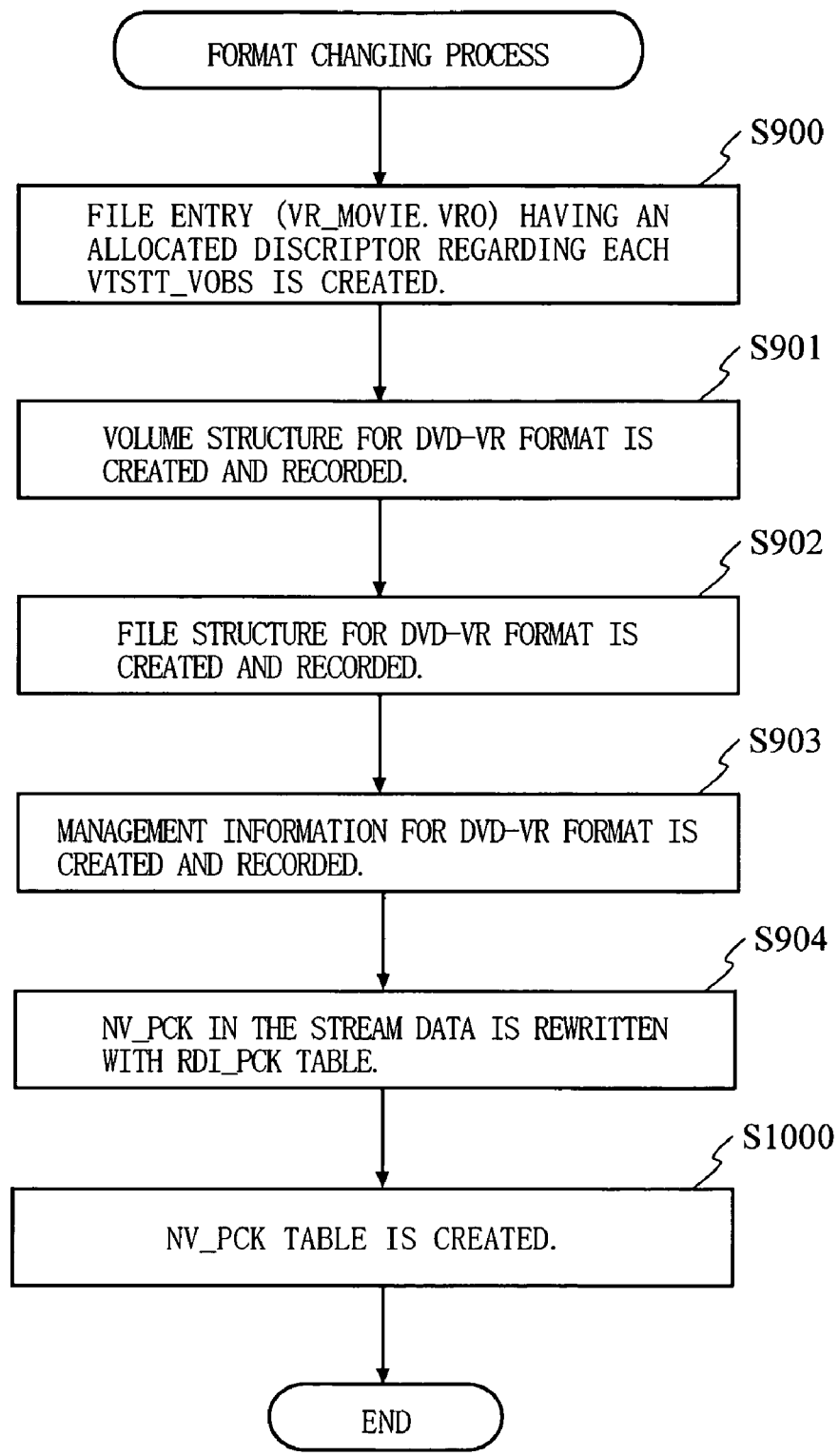
FIG. 10 is a flowchart illustrating a format changing process in a format changing method according to a second embodiment of the present invention.

A format changing method according to the second embodiment of the present invention will be described regarding the differences from the format changing method according to the first embodiment. In step S904 of the format changing process, when rewriting the NV_PCK recorded at the beginning of each VOBU of the VTSTT_VOBU with a corresponding RDI_PCK based on the RDI_PCK table, the system control section 103 records a list associating the NV_PCKs with corresponding VOBs and VOBUs (see FIG. 11) (step S1000 in FIG. 10). This list will be referred to as the "NV_PCK table".

The format changing method according to the second embodiment is provided by adding the above-described processes to the format changing method according to the first embodiment. When, after changing the format of the DVD medium to the DVD-VR format once, the user wishes to change the format back to the DVD-Video format, the NV_PCK which was rewritten with the RDI_PCK for changing the format into the DVD-VR format can be again rewritten at the beginning of each VOB and each VOBU based on the NV_PCK table. Thus, the DVD-VR format can be re-changed into the DVD-Video format. It should be noted that the format changing method according to the second embodiment is effective only on a DVD medium having no program recorded thereon by the DVD-VR format after the DVD-Video format was once changed into the DVD-VR format.

Third Embodiment

A format changing method according to the third embodiment of the present invention will be described regarding the differences from the format changing method according to the first embodiment. In step S904 of the format changing process, the system control section 103 does not rewrite the NV_PCK recorded at the beginning of each VOBU of the VTSTT_VOBS with the RDI_PCK of a corresponding VOBU based on the RDI_PCK table. Instead, the system control section 103 creates an allocated descriptor in the file entry of the VR_MOVIE.VRO file, such that each RDI_PCK recorded in the RDI_PCK table is located at the beginning of the corresponding VOBU.

The format changing method according to the third embodiment is provided by altering the format changing method according to the first embodiment as described above. It should be noted that the VR_MOVIE.VRO file is a real time data file, and therefore when the file data is excessively distributed, the continuity of the data at the time of reproduction may be lost. This is solved, though, by improving the reading speed from the drive section 109 to the stream buffer section 106.

Fourth Embodiment

An information recording method and an information reproduction method according to the fourth embodiment of the present invention will be described. By the information recording method according to the fourth embodiment, unlike the information recording method according to the first embodiment, the system control section 103 does not accumulate the RDI_PCK information, or create or record the RDI_PCK table in the DVD-Video format recording process. Instead, the system control section 103 records a flag which indicates that the program has been recorded in accordance with the DVD-Video format (hereinafter, such a flag will be referred to as the "program format flag"). The program format flag may be recorded in the program extent information, in the MNFI 1513 which is the manufacturer information in the RDI_PCK, or in an empty space in the disc separately from these areas.

When the user issues an instruction to reproduce a program via the UI section 102 after the format of the DVD medium is changed into the DVD-VR format, the system control section 103 first confirms the program format flag. When it is confirmed that the program format flag is recorded, the system control section 103 instructs the decoder section 107 to decode the AV data recorded on the disc as AV data conformed to the DVD-Video format. As a result, the AV data recorded on the disc is reproduced in accordance with the DVD-Video format.

According to the information reproduction method of this embodiment, the data on the disc after the format is changed into the DVD-VR format can be reproduced without requiring a complicated information recording method or format changing method. This simplifies the structure of the apparatus and the program for controlling the apparatus.

Fifth Embodiment

An information recording method according to the fifth embodiment of the present invention will be described regarding the differences from the information recording method according to the first embodiment. After the format changing process by the format changing method according to the first embodiment is finished, the system control section 103 sets the data area in which the VTSI and the VTSI backup are recorded as an unrecorded area in the space bitmap descriptor 1314 of the file structure. This setting allows the data area, in which the VTSI and the VTSI backup have been recorded in the disc after the format change into the DVD-VR format, to be used as a data recording area. It should be noted that once the VTSI or the VTSI backup is erased, the re-change into the DVD-Video format according to the second embodiment is impossible.

An information recording method, a format changing method and an information reproduction method according to the present invention make it possible to, after video or audio information is recorded on a recordable DVD medium in accordance with the DVD-Video format, change the format of the recordable DVD into the DVD-VR format without erasing the program (the video or audio information) already recorded. Therefore, the present invention is applicable to, for example, a DVD recording/reproduction apparatus.

While the invention has been described in detail, the foregoing description is in all aspects illustrative and not restrictive. It is understood that numerous other modifications and variations can be devised without departing from the scope of the invention.

What is claimed is:

1. An information recording method for recording video and/or audio data on a recording medium in accordance with a first format, the information recording method comprising:
   a data length calculation step of calculating a data length which is sufficient both for recording, on the recording medium, volume structure information of the first format, file structure information of the first format and management information of the first format for managing all the video and/or audio information recorded on the recording medium, and for recording, on the recording medium, volume structure information of a second format, file structure information of the second format and management information of the second format for managing all the video and/or audio information recorded on the recording medium;
   a data area saving step of saving a data area having the data length calculated by the data length calculation step in advance at a predetermined position of the recording medium;
   a video and/or audio data recording step of recording the video and/or audio data in accordance with the first format, in an area of the recording medium other than the data area saved by the data area saving step;
   a second format management information recording step of recording the management information of the second format or data necessary for creating the management information of the second format, in an area of the recording medium other than the data area where the video and/or audio data is recorded and other than the data area saved by the data area saving step, as information for changing the first format into the second format; and
   a second format information recording step of recording the volume structure information, the file structure information and the management information of the second format in the data area saved by the data area saving step.

2. The information recording method according to claim 1, wherein the video and/or audio data recording step includes:
   a video title set information recording step of recording video title set information for managing a video object included in the video and/or audio data of the first format, in the area of the recording medium other than the data area where the video and/or audio data is recorded and other than the data area saved by the data area saving step; and
   a program extent information recording step of recording program extent information including a recording position and a data length of the video and/or audio data in the recording medium and a recording position and a data length of the video title set information in the recording medium.

3. An information recording method according to claim 2, further comprising a real time data information recording step of recording real time data information including reproduction time information, recording time information, display control information and copy control information for managing a video object unit included in the video and/or audio data of the second format, in the area of the recording medium other than the data area where the video and/or audio data is recorded and other than the data area saved by the data area saving step, wherein the real time data information is recorded in association with the video object of the first format and a video object unit included in the video object, and is recorded as information for changing the first format into the second format.

4. An information recording method according to claim 3, further comprising a navigation data information saving step of recording navigation data information including reproduction control information and data search information for managing the video object unit of the first format, in a data area of the recording medium where the video and/or audio data is not recorded, wherein the navigation data information is recorded in association with the video object of the first format and the video object unit included in the video object, and is recorded as information for changing the second format into the first format.

5. An information recording method according to claim 3, further comprising a second format file structure creation step of creating a file structure of the second format, such that the real time data information is located at the position of the navigation data information including the reproduction control information and the data search information for managing the video object unit of the first format.

6. An information recording method according to claim 3, further comprising an unallocated recording area setting step of setting the data area where the video title set information is recorded as an unallocated recording area.

7. An information recording method according to claim 2, further comprising:

a format management flag creation step of creating a format management flag which indicates that the video and/or audio data is recorded in accordance with the first format; and a format management flag recording step of recording the format management flag on the recording medium.

8. A format changing method for changing the first format, in accordance with which video and/or audio data and management information are recorded on a recording medium, into a second format, wherein the recording medium has a data area having a data length saved in advance which is sufficient both for recording, on the recording medium, volume structure information of the second format, file structure information of the second format and management information of the second format for managing all the video and/or audio information recorded on the recording medium, and the recording medium also has recorded thereon the video and/or audio data of the first format, the management information of the second format or data necessary for creating the management information of the second format, video title set information for managing a video object included in the video and/or audio data of the first format, program extent information including a recording position and a data length of the video and/or audio data of the first format in the recording medium and a recording position and a data length of the video title set information in the recording medium, and real time data information including reproduction time information, recording time information, display control information and copy control information for managing a video object unit included in video and/or audio data of the second format, the format changing method comprising:

a second format file structure information creation step of creating file structure information for reproducing the video and/or audio data of the first format as the video and/or audio data of the second format based on the program extent information;

a second format information creation step of creating volume structure information of the second format and file structure information other than the file structure information created by the second format file structure information creation step, and when the recording medium does not have the management information of the second format recorded thereon, of further creating the management information of the second format based on the data necessary for creating the management information of the second format;

a second format information recording step of recording the volume structure information, the file structure information and the management information of the second format in the saved data area; and a navigation data information rewriting step of rewriting the navigation data information including the reproduction control information and the data search information for managing the video object unit included in the video object of the first format with the real time data information.

9. An information recording method according to claim 1, wherein the first format is the DVD Video format and the second format is the DVD Video Recording format.

10. A format changing method according to claim 8, wherein the first format is the DVD Video format and the second format is the DVD Video Recording format.

* * * * *